(12) United States Patent
Terasaki

(10) Patent No.: US 11,340,869 B2
(45) Date of Patent: May 24, 2022

(54) SUM-OF-PRODUCTS OPERATOR, SUM-OF-PRODUCTS OPERATION METHOD, LOGICAL OPERATION DEVICE, AND NEUROMORPHIC DEVICE

(71) Applicant: TDK CORPORATION, Tokyo (JP)

(72) Inventor: Yukio Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 282 days.

(21) Appl. No.: 16/675,423

(22) Filed: Nov. 6, 2019

(65) Prior Publication Data

US 2020/0150927 A1 May 14, 2020

(30) Foreign Application Priority Data

Nov. 8, 2018 (WO) .................. PCT/JP2018/041478

(51) Int. Cl.
*G06F 7/544* (2006.01)
*G06N 3/063* (2006.01)

(52) U.S. Cl.
CPC ......... *G06F 7/5443* (2013.01); *G06N 3/0635* (2013.01)

(58) Field of Classification Search
CPC .............. G06F 7/5443; G06F 7/163; G06F 2207/4824; G06F 2207/4802; G06F 2207/4814; G06N 3/0635
USPC ........................................................ 708/190
See application file for complete search history.

(56) References Cited

U.S. PATENT DOCUMENTS

| | | | |
|---|---|---|---|
| 10,621,267 B2 * | 4/2020 | Strachan | ............. H01L 27/2463 |
| 2019/0066780 A1 * | 2/2019 | Hu | ........................... G11C 11/56 |
| 2019/0171418 A1 | 6/2019 | Morie et al. | |

FOREIGN PATENT DOCUMENTS

WO 2018/034163 A1 2/2018

OTHER PUBLICATIONS

Jang et al.; "Optimization of Conductance Change in Pr1-xCaxMnO3-Based Synaptic Devices for Neuromorphic Systems;" IEEE Electron Device Letters; May 5, 2015; vol. 36, No. 5, pp. 457-459.
Burr et al.; Experimental demonstration and tolerancing of a large-scale neural network (165,000 synapses), using phase-change memory as the synaptic weight element; IEEE; 2015.

* cited by examiner

*Primary Examiner* — Tan V Mai
(74) *Attorney, Agent, or Firm* — Oliff PLC

(57) ABSTRACT

A sum-of-products operator including: a first circuit configured to generate a plurality of signals, each of which corresponds to each of a plurality of data; a second circuit including a first operation circuit configured to multiply each of the signals generated by the first circuit by a weight using a plurality of variable resistive elements having variable resistance values, and to calculate a sum of a plurality of results of multiplications; a third circuit configured to calculate a result of summing values corresponding to the data or a result of the summing value after being adjusted; and a fourth circuit including a differential circuit configured to output a difference between a calculated result in the first operation circuit of the second circuit and a calculated result in the third circuit.

14 Claims, 7 Drawing Sheets

FIG. 2

| INPUT CASE1 | CALCULATION WEIGHT | | SHIFT WEIGHT TO POSITIVE VALUE | |
|---|---|---|---|---|
| | WEIGHT | SUM-OF-PRODUCTS OPERATION | WEIGHT | SUM-OF-PRODUCTS OPERATION |
| 1 | 0.4 | -0.2 | -0.08 | 0.3 | 0.12 |
| 2 | 0.1 | -0.4 | -0.04 | 0.1 | 0.01 |
| 3 | 0.2 | 0 | 0 | 0.5 | 0.1 |
| 4 | 0.8 | -0.1 | -0.08 | 0.4 | 0.32 |
| 5 | 1 | 0.5 | 0.5 | 1 | 1 |
| sum | 2.5 | -0.2 | 0.3 | | 1.55 |

| INPUT CASE2 | CALCULATION WEIGHT | | SHIFT WEIGHT TO POSITIVE VALUE | |
|---|---|---|---|---|
| | WEIGHT | SUM-OF-PRODUCTS OPERATION | WEIGHT | SUM-OF-PRODUCTS OPERATION |
| 1 | 0.2 | -0.2 | -0.04 | 0.3 | 0.06 |
| 2 | 0 | -0.4 | 0 | 0.1 | 0 |
| 3 | 0.1 | 0.2 | 0.02 | 0.7 | 0.07 |
| 4 | 0.5 | 0 | 0 | 0.5 | 0.25 |
| 5 | 0.3 | 0.5 | 0.15 | 1 | 0.3 |
| sum | 1.1 | 0.1 | 0.13 | | 0.68 |

FIG. 3

CORRECTION OF VOLTAGE

2021

| INPUT | | CALCULATION IN CALCULATOR | | CALCULATION USING NEUROMORPHIC ARRAY | | | | | | | | |
|---|---|---|---|---|---|---|---|---|---|---|---|---|
| | | | | INPUT CHARACTERISTICS | | ELEMENT | | ARRAY OUTPUT | CAPACITANCE | VOLTAGE OUTPUT | VOLTAGE CORRECTION | NORMALIZATION |
| CASE1 | | WEIGHT | SUM-OF-PRODUCTS OPERATION | COUNTER VALUE | PULSE WIDTH (ns) | E (V) | G (μS) | I (μA) | Q (C) | C (F) | OUTPUT VOLTAGE (μV) | Δ | OUTPUT VOLTAGE (μV) | VALUE RANGE :±5 |
| 1 | 0.4 | −0.2 | −0.08 | 102 | 1020 | 0.2 | 1.4 | 0.28 | 2.856E−13 | | | | |
| 2 | 0.1 | −0.4 | −0.04 | 25 | 250 | 0.2 | 1.3 | 0.26 | 6.5E−14 | | | | |
| 3 | 0.2 | 0 | 0 | 51 | 510 | 0.2 | 1.5 | 0.3 | 1.53E−13 | | | | |
| 4 | 0.8 | −0.1 | −0.08 | 204 | 2040 | 0.2 | 1.45 | 0.29 | 5.916E−13 | | | | |
| 5 | 1 | 0.5 | 0.5 | 255 | 2550 | 0.2 | 1.75 | 0.35 | 8.925E−13 | | | | |
| sum | 2.5 | −0.2 | 0.3 | 637 | 6370 | | | | 1.9877E−12 | 1E−09 | 1987.7 | 1911 | 76.7 | 0.3007843 |
| CASE2 | | WEIGHT | SUM-OF-PRODUCTS OPERATION | COUNTER VALUE | PULSE WIDTH (ns) | E (V) | G (μS) | I (μA) | Q (C) | C (F) | OUTPUT VOLTAGE (μV) | Δ | OUTPUT VOLTAGE (μV) | VALUE RANGE :±5 |
| 1 | 1 | −1 | −1 | 255 | 2550 | 0.2 | 1 | 0.2 | 5.1E−13 | | | | |
| 2 | 1 | −1 | −1 | 255 | 2550 | 0.2 | 1 | 0.2 | 5.1E−13 | | | | |
| 3 | 1 | −1 | −1 | 255 | 2550 | 0.2 | 1 | 0.2 | 5.1E−13 | | | | |
| 4 | 1 | −1 | −1 | 255 | 2550 | 0.2 | 1 | 0.2 | 5.1E−13 | | | | |
| 5 | 1 | −1 | −1 | 255 | 2550 | 0.2 | 1 | 0.2 | 5.1E−13 | | | | |
| sum | 5 | −5 | −5 | 1275 | 12750 | | | | 2.55E−12 | 1E−09 | 2550 | 3825 | −1275 | −5 |

FIG. 4

CORRECTION OF AMOUNT OF CHARGE

<table>
<tr><th rowspan="3">INPUT</th><th colspan="3">CALCULATION IN CALCULATOR</th><th colspan="12">CALCULATION USING NEUROMORPHIC ARRAY</th></tr>
<tr><th rowspan="2"></th><th rowspan="2">WEIGHT</th><th rowspan="2">SUM-OF-PRODUCTS OPERATION</th><th colspan="2">INPUT CHARACTERISTICS</th><th colspan="3">ELEMENT</th><th colspan="2">ARRAY OUTPUT</th><th colspan="2">CHARGE AMOUNT CORRECTION</th><th>CAPACITANCE</th><th colspan="2">VOLTAGE OUTPUT</th><th>NORMALIZATION</th></tr>
<tr><th>COUNTER VALUE</th><th>PULSE WIDTH (ns)</th><th>E (V)</th><th>G ($\mu$S)</th><th>I ($\mu$A)</th><th>Q (C)</th><th></th><th>$\Delta$</th><th>Q AFTER CORRECTION</th><th>C (F)</th><th>OUTPUT VOLTAGE ($\mu$V)</th><th></th><th>VALUE RANGE :±5</th></tr>
<tr><td rowspan="6">CASE1</td><td>1</td><td>0.4</td><td>-0.2</td><td>-0.08</td><td>102</td><td>1020</td><td>0.2</td><td>1.4</td><td>0.28</td><td>2.856E-13</td><td></td><td></td><td></td><td></td><td></td></tr>
<tr><td>2</td><td>0.1</td><td>-0.4</td><td>-0.04</td><td>25</td><td>250</td><td>0.2</td><td>1.3</td><td>0.26</td><td>6.5E-14</td><td></td><td></td><td></td><td></td><td></td></tr>
<tr><td>3</td><td>0.2</td><td>0</td><td>0</td><td>51</td><td>510</td><td>0.2</td><td>1.5</td><td>0.3</td><td>1.53E-13</td><td></td><td></td><td></td><td></td><td></td></tr>
<tr><td>4</td><td>0.8</td><td>-0.1</td><td>-0.08</td><td>204</td><td>2040</td><td>0.2</td><td>1.45</td><td>0.29</td><td>5.916E-13</td><td></td><td></td><td></td><td></td><td></td></tr>
<tr><td>5</td><td>1</td><td>-1</td><td>-1</td><td>255</td><td>2550</td><td>0.2</td><td>1</td><td>0.2</td><td>5.1E-13</td><td></td><td></td><td></td><td></td><td></td></tr>
<tr><td>sum</td><td>2.5</td><td>-1.7</td><td>-1.2</td><td>637</td><td>6370</td><td></td><td></td><td></td><td>1.6052E-12</td><td>1.911E-12</td><td>-3.06E-13</td><td>1E-09</td><td>-305.8</td><td>-1.199216</td></tr>
<tr><td rowspan="6">CASE2</td><td></td><td></td><td>WEIGHT</td><td>SUM-OF-PRODUCTS OPERATION</td><td>COUNTER VALUE</td><td>PULSE WIDTH (ns)</td><td>E (V)</td><td>G ($\mu$S)</td><td>I ($\mu$A)</td><td>Q (C)</td><td></td><td>$\Delta$</td><td>Q AFTER CORRECTION</td><td>C (F)</td><td>OUTPUT VOLTAGE ($\mu$V)</td><td>VALUE RANGE :±5</td></tr>
<tr><td>1</td><td>0.2</td><td>-0.2</td><td>-0.04</td><td>51</td><td>510</td><td>0.2</td><td>1.4</td><td>0.28</td><td>1.428E-13</td><td></td><td></td><td></td><td></td><td></td></tr>
<tr><td>2</td><td>0</td><td>-0.4</td><td>0</td><td>0</td><td>0</td><td>0.2</td><td>1.3</td><td>0.26</td><td>0</td><td></td><td></td><td></td><td></td><td></td></tr>
<tr><td>3</td><td>0.1</td><td>0.2</td><td>0.02</td><td>25</td><td>250</td><td>0.2</td><td>1.6</td><td>0.32</td><td>8E-14</td><td></td><td></td><td></td><td></td><td></td></tr>
<tr><td>4</td><td>0.5</td><td>0</td><td>0</td><td>127</td><td>1270</td><td>0.2</td><td>1.5</td><td>0.3</td><td>3.81E-13</td><td></td><td></td><td></td><td></td><td></td></tr>
<tr><td>5</td><td>0.3</td><td>0.5</td><td>0.15</td><td>76</td><td>760</td><td>0.2</td><td>1.75</td><td>0.35</td><td>2.66E-13</td><td></td><td></td><td></td><td></td><td></td></tr>
<tr><td>sum</td><td>1.1</td><td>0.1</td><td>0.13</td><td>279</td><td>2790</td><td></td><td></td><td></td><td>8.698E-13</td><td>8.37E-13</td><td>3.28E-14</td><td>1E-09</td><td>32.8</td><td>0.1286275</td></tr>
</table>

2031

SUM-OF-PRODUCTS OPERATOR, SUM-OF-PRODUCTS OPERATION METHOD, LOGICAL OPERATION DEVICE, AND NEUROMORPHIC DEVICE

Priority is claimed on PCT Application No. PCT/JP2018/041478, filed Nov. 8, 2018, the content of which is incorporated herein by reference.

BACKGROUND OF THE INVENTION

Field of the Invention

The present invention relates to a sum-of-products operator, a sum-of-products operation method, a logical operation device, and a neuromorphic device.

Description of Related Art

For example, a sum-of-products operation is performed in a circuit such as a neural network. Research on a technology for executing such a sum-of-products operation in an analog manner is ongoing. In this technology, a configuration where an element of which the resistance changes (also referred to as a "variable resistive element" for convenience of description) is used is being examined. In particular, the use of the variable resistive element having linearly changing resistance is being examined as an element having good characteristics.

In recent years, a neuromorphic element of which the conductance (reciprocal of the resistance) changes in an analog manner has attracted attention as such a variable resistive element. Research on a new operation mechanism that can execute a sum-of-products operation with low power and at high speed using a neuromorphic element has been conducted.

More specifically, a circuit representing coupling between layers of a neural network is realized by an array using signal lines and variable resistive elements. For example, an input signal modulated according to a pulse length, a voltage or a pulse frequency is applied to the array. The amount of current flowing through a predetermined signal line is used as a result of a sum-of-products operation. In such a configuration, the array functions as a circuit constituting an analog sum-of-products operator. It is also possible to constitute an array functioning as a circuit constituting a digital sum-of-products operator.

For example, in a neural network, a weight of coupling may have a negative value. In order to realize the sum-of-products operation using the array in such a neural network, it is necessary to express a weight having a positive value and a weight having a negative value.

Here, since the variable resistive element cannot have a negative conductance, research on expressing the weight having a negative value in the sum-of-products operator has been conducted.

As an example, in a sum-of-products operation device described in Patent Document 1, a configuration where element arrays are separated by weights having a positive value and weights having a negative value, absolute values are assigned as these weights, and a difference between a result of a positive element array and a result of a negative element array is calculated after multiplication of the weights is used (see Patent Document 1).

PATENT DOCUMENTS

[Patent Document 1] PCT International Publication No. 2018/034163

SUMMARY OF THE INVENTION

However, in the technology described in Patent Document 1, for example, a mechanism for assigning another element array according to a positive or negative sign of the weights is required, and the mechanism and control of the assignment may be complicated.

Further, Patent Document 1 does not disclose a configuration for expressing a sum-of-products operation in which weights having a positive value and weights having a negative value are mixed, and does not disclose a configuration where an integrated circuit that expresses the sum-of-products operation in a case where weights having a positive value and weights having a negative value are mixed is mounted.

As another configuration example, a configuration where two elements are assigned to each weight and a positive value and a negative value for each weight are stored by two elements is conceivable. However, in such a configuration, since two elements are required for each weight, a physical size of the array increases, a circuit for assignment according to a positive or negative sign is required, or the weight no longer functions as a weight when any of the elements fails. Therefore, when a large-scale array is used, problems such as reduction in an array yield or a need for measures such as providing a redundant area therefor arise.

The present invention has been made in consideration of such circumstances, and an object of the present invention is to provide a sum-of-products operator capable of easily realizing a sum-of-products operation in which weights having a positive value and weights having a negative value are mixed, a sum-of-products operation method, a logical operation device, and a neuromorphic device.

An aspect of the present invention is a sum-of-products operator including: a first circuit configured to generate a plurality of signals, each of which corresponds to each of a plurality of data; a second circuit including a first operation circuit configured to multiply each of the signals generated by the first circuit by a weight using a plurality of variable resistive elements having variable resistance values, and to calculate a sum of a plurality of results of multiplications; a third circuit configured to calculate a result of summing values corresponding to the data or a result of the summing value after being adjusted; and a fourth circuit including a differential circuit configured to output a difference between a calculated result in the first operation circuit of the second circuit and a calculated result in the third circuit.

In the sum-of-products operator according to the aspect of the present invention, a result to be calculated in the first operation circuit of the second circuit and a result to be calculated in the third circuit are analog signals, and the differential circuit of the fourth circuit is an analog circuit.

In the sum-of-products operator according to the aspect of the present invention, a result to be calculated in the first operation circuit of the second circuit and a result to be calculated in the third circuit are digital data, and the differential circuit of the fourth circuit is a digital circuit.

In the sum-of-products operator according to the aspect of the present invention, a common variation range of conductance is set in the variable resistive elements, the first operation circuit of the second circuit has capacitance for acquiring the sum of results of multiplication, and a result to be calculated in the third circuit is a result of multiplying (the result of summing the values corresponding to the data), (a central value of the common variation range of the conductance of the variable resistive elements), and {1/(the capacitance)} together.

In the sum-of-products operator according to the aspect of the present invention, a common variation range of conductance in the variable resistive elements is set, the first operation circuit of the second circuit has capacitance for acquiring the sum of results of multiplication, and a result to be calculated in the third circuit corresponds to a sum of: a result of multiplying a product of (the result of summing the values corresponding to the data), (a central value of the common variation range of the conductance of the variable resistive elements), and {1/(the capacitance)} by a first coefficient; and a second coefficient together.

In the sum-of-products operator according to the aspect of the present invention, generation of the signals corresponding to the data in the first circuit is performed by the first circuit generating pulse width modulation signals, each of which corresponds to each of the data.

In the sum-of-products operator according to the aspect of the present invention, generation of the signals corresponding to the data in the first circuit is performed by the first circuit generating amplitude width modulation signals, each of which corresponds to the data.

In the sum-of-products operator according to the aspect of the present invention, generation of the signals corresponding to the data in the first circuit is performed by the first circuit generating pulse frequency modulation signals, each of which corresponds to the data.

In the sum-of-products operator according to the aspect of the present invention, the second circuit has a plurality of the first operation circuits, and the fourth circuit includes a differential circuit for each of the first operation circuits.

In the sum-of-products operator according to the aspect of the present invention, the data are input to the third circuit in a time series order, and the third circuit is configured to sum values corresponding to the data in the time series order.

In the sum-of-products operator according to the aspect of the present invention, the variable resistive elements are magnetoresistive effect elements that exhibit a magnetoresistive effect.

An aspect of the present invention is a sum-of-products operation method being performed in a sum-of-products operator including a first circuit, a second circuit, a third circuit, and a fourth circuit, the second circuit including a first operation circuit, and the fourth circuit including a differential circuit, the sum-of-products operation method including the steps of: generating, by the first circuit, signals, each of which corresponds to each of a plurality of data; multiplying, by the first operation circuit of the second circuit, each of the signals generated by the first circuit by a weight using a plurality of variable resistive elements having variable resistance values and calculating a sum of a plurality of results of multiplications; calculating, by the third circuit, a result of summing values corresponding to the data or a result of the summing value after being adjusted; and outputting, by the differential circuit of the fourth circuit, a difference between a calculated result in the first operation circuit of the second circuit and a calculated result in the third circuit.

An aspect of the present invention is a logical operation device including any one of the sum-of-products operators, wherein the logical operation device executes a logic operation.

An aspect of the present invention is a neuromorphic device including any one of the sum-of-products operators, wherein one of the variable resistive elements of the sum-of-products operator is a neuromorphic element.

According to an aspect of the present invention, it is possible to easily realize a sum-of-products operation in which weights having a positive value and weights having a negative value are mixed.

BRIEF DESCRIPTION OF THE DRAWINGS

FIG. 2 is a diagram showing a specific example of theoretical values according to the embodiment of the present invention.

FIG. 3 is a diagram showing a specific example (correction of a voltage) of a value simulation according to the embodiment of the present invention.

FIG. 4 is a diagram showing a specific example (correction of the amount of charge) of a value simulation according to the embodiment of the present invention.

DETAILED DESCRIPTION OF THE INVENTION

Hereinafter, embodiments of the present invention will be described with reference to the drawings.
(First Embodiment)
[Configuration of Sum-of-Products Operator]

Figure 1:
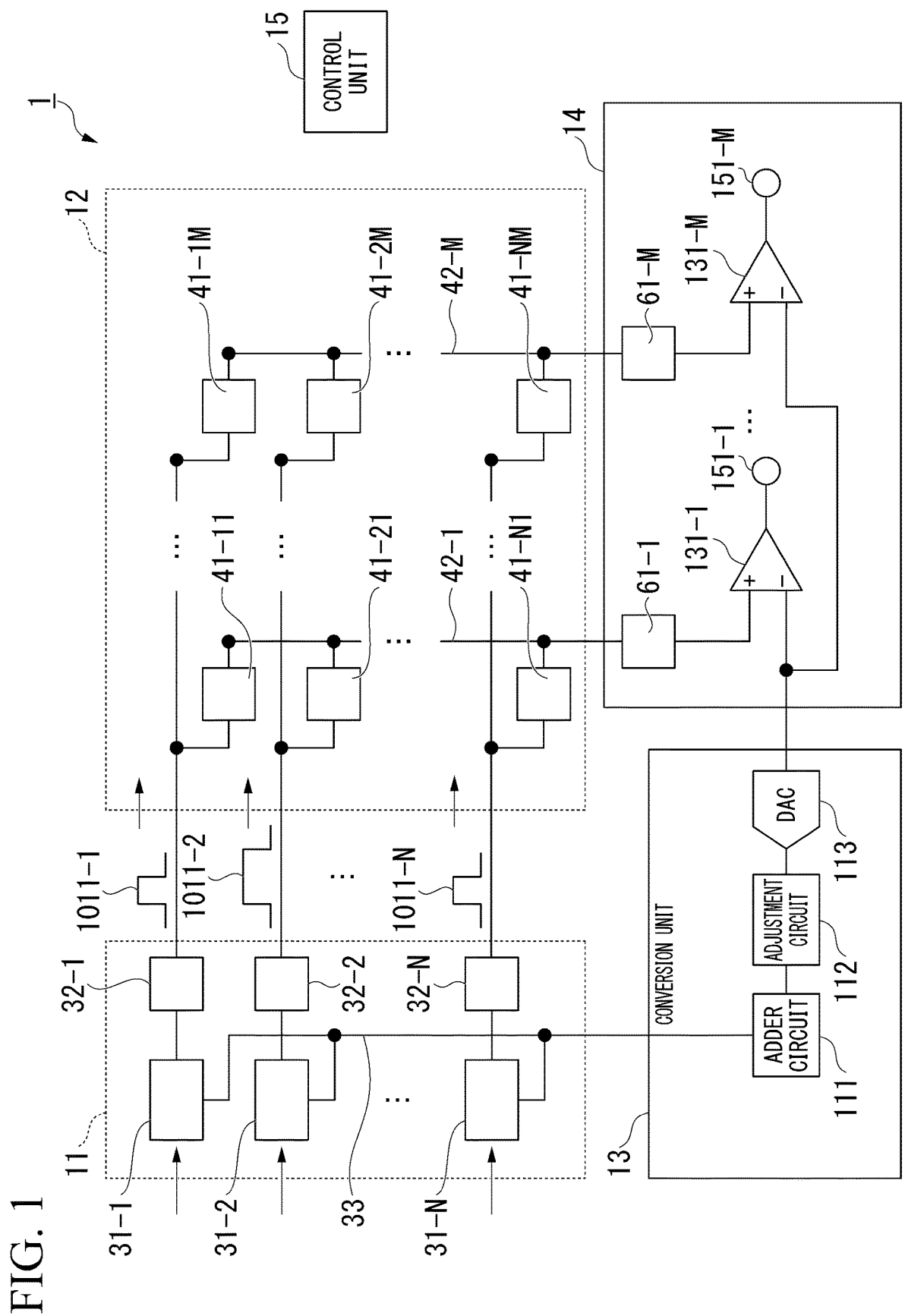
FIG. 1 is a diagram showing a schematic configuration of a sum-of-products operator according to an embodiment (a first embodiment) of the present invention.

FIG. 1 is a diagram showing a schematic configuration of a sum-of-products operator 1 according to an embodiment (a first embodiment) of the present invention.

The sum-of-products operator 1 includes an input unit 11, an array unit 12, a conversion unit 13, and an output unit 14.

Further, FIG. 1 shows a control unit 15 that controls the sum-of-products operator 1. In the first embodiment, the control unit 15 is configured as a functional unit different from the sum-of-products operator 1. In this case, the sum-of-products operator 1 and the control unit 15 may be regarded as being included in, for example, a predetermined device (for example, a sum-of-products operation device) or a predetermined system (for example, a sum-of-products operation system). As another example, the control unit 15 may be configured integrally with the sum-of-products operator 1. In this case, the sum-of-products operator 1 may be regarded as including the control unit 15.

In the first embodiment, the array unit 12 includes an array of N rows and M columns. In the first embodiment, N is an integer equal to or greater than 2, and M is an integer equal to or greater than 2. In the example of FIG. 1, a case where N is an integer equal to or greater than 3 is shown for convenience of illustration, but N may be 2. Further, in the first embodiment, an array of a plurality of rows and a plurality of columns is shown, but as another example, M may be 1, that is, an array of a plurality of rows and one column may be used.

Here, in the sum-of-products operator 1, a plurality of circuit elements are connected by signal lines. In the first embodiment, for convenience of description, some signal lines are denoted with reference numerals and described, and other signal lines are not denoted with reference numerals and a detailed description thereof will be omitted here.

A configuration where a signal is transmitted wirelessly may be used instead of signal lines that transmit a signal using wires.

The input unit 11 includes N input registers 31-1 to 31-N corresponding to N rows, N input signal generation circuits 32-1 to 32-N corresponding to the N rows, and a signal line 33. Here, the input signal generation circuits 32-1 to 32-N may include, for example, a combination of a driver circuit such as an output buffer or an input and output buffer and a modulation circuit in a stage before the driver circuit. In this case, a role of the modulation circuits of the input signal generation circuits 32-1 to 32-N is to output a signal modulated with values of the input registers 31-1 to 31-N from a source signal (not shown) for an input signal to the driver circuit.

The array unit 12 includes (N×M) variable resistive elements 41-11 to 41-NM corresponding to (N×M) rows, and M signal lines 42-1 to 42-M corresponding to M columns.

In the example of FIG. 1, the variable resistive element 41-$ij$ indicates a variable resistive element in an i-th row and a j-th column. i is an integer equal to or greater than 1 and equal to or smaller than N, and j is an integer equal to or greater than 1 and equal to or smaller than M. In the example of FIG. 1, in the array unit 12, M systems of N variable resistive elements arranged in a row direction (a vertical direction in FIG. 1) are arranged in a column direction (a horizontal direction in the example of FIG. 1). In the first embodiment, i and j may be used for convenience of description.

In the first embodiment, each variable resistive element 41-$ij$ is a neuromorphic element.

Each variable resistive element 41-$ij$ may be, for example, a non-volatile element. Each variable resistive element 41-$ij$ may be, for example, a magnetoresistive effect element that exhibits a magnetoresistive effect. The magnetoresistive effect element may be an element in which a resistance is changed using spin.

For example, a magnetoresistive effect element having linearity in change in conductance is known. In such a magnetoresistive effect element, for example, the conductance changes linearly according to change in a physical quantity that changes the conductance (a relationship between magnetizations of two ferromagnetic layers of the magnetoresistive effect element). Further, such a magnetoresistive effect element having symmetry in change in conductance is known. This symmetry is symmetry between a way in which the conductance increases and a way in which the conductance decreases. That is, an absolute value of a rate of change of the conductance when the conductance increases from one value to another value, and an absolute value of the conductance change rate when the conductance decreases from the other value to the one value match except for a difference due to error. Thus, it is preferable for a magnetoresistive effect element having linearity and symmetry in change in conductance to be used for each variable resistive element 41-$ij$.

Any element may be used as the neuromorphic element. Further, as the neuromorphic element, for example, a plurality of one type of neuromorphic element may be used in combination, or two or more types of neuromorphic elements may be used in combination. As an example, an element using a phase change memory (PCM) that controls a phase change between crystal and amorphous step by step may be used as the neuromorphic element. As another example, an element using a conductive bridge random access memory (CBRAM), in which formation and disappearance of a path between metal deposition and ionization according to an electrochemical reaction are used, may be used as the neuromorphic element. As another example, an element using spintronics may be used as the neuromorphic element. For example, a domain wall type element that causes a linear resistance change according to control of a magnetic domain wall or a spin orbit torque (SOT) type element using magnetization inversion due to a spin orbit torque action may be used. As another example, an element using a resistive random access memory (ReRAM) in which a filament using metal deposition is formed in a medium such as $TaO_2$ and a resistance change is used may be used as the neuromorphic element.

The conversion unit 13 includes an adder circuit 111, an adjustment circuit 112, and a digital-to-analog converter (DAC) 113. The output unit 14 includes M detection circuits 61-1 to 61-M corresponding to M columns, M differential circuits 131-1 to 131-M corresponding to M rows, and M output terminals 151-1 to 151-M corresponding to the M columns. Each of the M differential circuits 131-1 to 131-M may be, a differential circuit or may be, for example, an operational amplifier.

Here, each circuit in the sum-of-products operator 1 is divided into several functional units (for example, the input unit 11, the array unit 12, the conversion unit 13, and the output unit 14) for convenience of description in the first embodiment, but such a division is an example and any other division may be used. Further, such a division is not necessarily used.

[Function and Action of Each Circuit in Sum-of-Products Operator]

An example of a function and action of each circuit in the sum-of-products operator 1 will be described.

Data that is input from an external device (also referred to as "input data" for convenience of description) is stored in each of the N input registers 31-1 to 31-N. The data may be referred to as digital data ("digital signal").

Here, the external device may be any device. The external device may be, for example, a storage device that stores data, or may be an element such as a computer or a sensor that outputs data. The external device inputs data that is a target on which an operation is performed by the sum-of-products operator 1 to each of the N input registers 31-1 to 31-N. In the first embodiment, the data that is input to the sum-of-products operator 1 is a combination of N data corresponding to the N rows. Regarding input of the data to the sum-of-products operator 1, for example, the external device may initiate input of the data to the sum-of-products operator 1 or the sum-of-products operator 1 may initiate receiving the data from the external device.

The input register 31-$i$ in the i-th row outputs the stored data to the input signal generation circuit 32-$i$ in the i-th row. Here, in the first embodiment, the N input registers 31-1 to 31-N output, in a time series order, respective N data input to the N input registers 31-1 to 31-N in a time series order. Accordingly, in the first embodiment, a combination of N data corresponding to N rows input to the sum-of-products operator 1 is processed as it is. When such a process is realized, any timing may be used as a timing when data is input to each of the N input registers 31-1 to 31-N, or a timing when data is output from each of the N input registers 31-1 to 31-N.

Data output from each of the N input registers 31-1 to 31-N are also transmitted to the adder circuit 111. In the first embodiment, pieces of the data output from the N input registers 31-1 to 31-N are input to the same signal line 33 and transmitted to the adder circuit 111 via the signal line 33.

Here, each of the input registers 31-1 to 31-N has a function of storing a predetermined range of values as a count value, for example. The predetermined range may be any range, and may be, for example, a range of 256 values from 0 to 255. In this case, the input data is, for example, a value in the same range as the predetermined range or a value in a range narrower than the predetermined range. In the first embodiment, a pulse waveform length (a pulse length) of a pulse width modulation (PWM) signal generated according to the count value corresponds to the count value. The count value may be regarded as a value of the input data or a value obtained by converting the value of the input data.

The input signal generation circuit 32-$i$ in the i-th row generates a signal to be input to the array unit 12 (also referred to as an "input signal" for convenience of description) on the basis of the data input from the input register 31-$i$ in the i-th row. Specifically, the input signal generation circuit 32-$i$ in the i-th row generates a signal having a width (a pulse length) corresponding to the value of the input data (a pulse width modulation signal) as an input signal. The input signal generation circuit 32-$i$ in the i-th row outputs the generated input signal to each of the M variable resistive elements 41-$i$1 to 41-$i$M in the i-th row in the array unit 12.

Here, FIG. 1 shows an example of input signals 1011-1 to 1011-N respectively generated by the N input signal generation circuits 32-1 to 32-N. A shape and timing of the input signals 1011-1 to 1011-N in FIG. 1 are rough and are not necessarily accurate. Each of the input signals 1011-1 to 1011-N is a voltage pulse signal. In the first embodiment, a height (voltage value) of the pulse is the same (constant). Each of the input signal generation circuits 32-1 to 32-N performs a process in a predetermined time unit, for example. The predetermined time unit may be, for example, 10 [ns] or 10 [μs].

The input signal output from the input signal generation circuit 32-$i$ in the i-th row is input to each of the M variable resistive elements 41-$i$1 to 41-$i$M in the i-th row. The M variable resistive elements 41-$i$1 to 41-$i$M in the i-th row output currents determined by the voltage of the input signal and the resistance values of the variable resistive elements 41-$i$1 to 41-$i$M.

The N variable resistive elements 41-1$j$ to 41-N$j$ in the j-th column output currents to the same signal line 42-$j$ that is shared by the respective columns. In the first embodiment, the currents output from the N variable resistive elements 41-1$j$ to 41-N$j$ in the j-th column are input to the same signal line 42-$j$ and flow through the detection circuit 61-$j$ in the j-th column via the signal line 42-$j$.

Here, the weight is realized by values of conductance of the respective variable resistive elements 41-11 to 41-NM. That is, in each of the variable resistive elements 41-11 to 41-NM, a current corresponding to a result of multiplying a pulse of a voltage that is an input signal by the weight is output. The current can be regarded as a result of calculated product of the input signal and the weight (the value of conductance in the first embodiment) according to Ohm's law. In this case, each of the variable resistive elements 41-11 to 41-NM can be regarded as a product operation unit. The conductance indicates a reciprocal of the resistance.

Therefore, the variable resistive elements 41-11 to 41-NM have two or more different conductance values since the variable resistive elements 41-11 to 41-NM have two or more different resistance values.

Further, in the signal line shared by the respective columns (the signal line 42-$j$ in the j-th column), currents that are output from the N variable resistive elements (the N variable resistive elements 41-1$j$ to 41-N$j$ in the j-th column) are transmitted. Accordingly, a sum of these currents can be calculated in the detection circuit for each column (the detection circuit 61-$j$ in the j-th column). That is, the sum-of-products operation in the j-th column is realized.

Such an action of such a sum-of-products operation is performed for all of the M columns, thereby realizing the sum-of-products operation of the M columns.

The adder circuit 111 sums the data input from the signal line 33. That is, the adder circuit 111 sums the data output from the N input registers 31-1 to 31-N through digital calculation. The adder circuit 111 outputs summation result data to the adjustment circuit 112. In the first embodiment, the adder circuit 111 sequentially sums the data output in a time series order from the N input registers 31-1 to 31-N, to calculate a sum of count values of the N input signal generation circuits 32-1 to 32-N.

A case where the adder circuit 111 sums all the data output from the N input registers 31-1 to 31-N has been shown in the first embodiment. However, a configuration where data having a value of 0 is excluded from an addition target of the adder circuit 111 may be used as another example. That is, in the adder circuit 111, even when the data having a value of 0 is excluded from the addition target, the summation result is the same.

The adjustment circuit 112 performs a predetermined adjustment by performing a predetermined operation on the data input from the adder circuit 111, and outputs the data after adjustment (data after the calculation) to the digital-to-analog converter 113. The predetermined adjustment may be, for example, an operation of multiplying input data by a predetermined coefficient, an operation of adding a predetermined coefficient to the input data, or an operation for adding a predetermined coefficient to a result obtained by performing an operation of the predetermined coefficient with respect to the input data.

The digital-to-analog converter 113 converts the data, which are input from the adjustment circuit 112, from digital data into analog signals, and outputs the converted analog signal to each of the M differential circuits 131-1 to 131-M. In the analog signal, a value of the digital data is reflected in a voltage value of the analog signal. That is, the digital-to-analog converter 113 converts the input digital data into an analog signal in a predetermined range. The range may be referred to as a dynamic range, for example. In the digital-to-analog converter 113, for example, the value of the input digital data and the output analog signal correspond to each other linearly on a one-to-one basis.

The analog signal output from the digital-to-analog converter 113 is expressed by, for example, Equation (1). When the digital-analog conversion in the digital-to-analog converter 113 is a one-to-one conversion, it can be considered that Equation (1) indirectly expresses the data after adjustment output from the adjustment circuit 112.

Vc, Pr, Vr, Gm, and Cd that are parameters in Equation (1) are described below. Vc indicates the voltage of the analog signal output from the digital-to-analog converter 113. Pr indicates the value of data that is output from the input register 31-$r$ in the r-th row. The value corresponds to the pulse width of the pulse width modulation signal output from the input signal generation circuit 32-r in the r-th row. Letter of "r" indicates an integer equal to or greater than 1 and equal to or smaller than N. Vr indicates a voltage of the pulse width modulation signal that is output from the input signal generation circuit 32-r in the r-th row. In the first embodiment, the voltages of the pulse width modulation signals output from all the input signal generation circuits 32-1 to 32-N are the same.

$\Sigma(Pr \times Vr)$ indicates a sum of $(Pr \times Vr)$ when r has a value from 1 to N. In the first embodiment, since Vr is constant, $\Sigma(Pr \times Vr)$ is equal to $\{(\Sigma Pr) \times Vr\}$. In the first embodiment, a sum of Pr is calculated by the adder circuit 111. Calculations other than the summing are performed by the adjustment circuit 112 and the digital-to-analog converter 113.

Gm indicates a central value of a variation range of a conductance of the variable resistive elements 41-11 to 41-NM. In the first embodiment, an ideal case is assumed, and the variation ranges of conductance of all the variable resistive elements 41-11 to 41-NM are the same. In practice, it is difficult to manufacture all elements having the same variable conductance range. Therefore, for example, as a practical scheme, a range of conductance that can be applied in common to all elements sharing a bit line is set.

Cd indicates capacitance of a capacitor constituting the detection circuits 61-1 to 61-M. In the first embodiment, the capacitance of the capacitor is the same among all the detection circuits 61-1 to 61-M. Each of K1 and K2 indicates a coefficient. These coefficients K1 and K2 are, for example, coefficients for correcting an error in variation due to individual differences occurring in actual circuit elements or the like, or an error due to temperature fluctuation or the like. The coefficient K1 is a coefficient for correcting a gain, and the coefficient K2 is a coefficient for correcting an offset. A configuration where one or both of the coefficient K1 and the coefficient K2 are not used may be used.

$$Vc = \Sigma(Pr \times Vr) \times Gm/Cd \times K1 + K2 \qquad (1)$$

Here, the coefficient K1 and the coefficient K2 may be reflected in, for example, one or both of a way of adjustment in the adjustment circuit 112 and characteristics of the digital-to-analog converter 113 on the basis of a result of actually measuring an operation result in the sum-of-products operator 1 in advance or other reference information. A scheme for calculating the data after adjustment from data before adjustment, for example, is set in the adjustment circuit 112 in advance. The scheme may be specified using, for example, information on an equation for calculating the data after adjustment from the data before adjustment.

Further, a configuration, where the coefficient K1 and the coefficient K2 are not used, may be used. In this case, the analog signal output from the digital-to-analog converter 113 is expressed by, for example, Equation (2). Equation (2) is equivalent to a case where the coefficient K1 is set to 1 and the coefficient K2 is set to 0 in Equation (1).

$$Vc = \Sigma(Pr \times Vr) \times Gm/Cd \qquad (2)$$

Here, in the first embodiment, a predetermined operation is generally performed by both the adder circuit 111 and the adjustment circuit 112. Although a configuration where an operation is performed separately by the adder circuit 111 and the adjustment circuit 112 has been described in the first embodiment, a configuration where the same operation is performed by one circuit or a configuration where the same operation is performed by a combination of any two or more circuits may be used as another example.

The detection circuit 61-j in the j-th column is configured to sum the currents output from the N variable resistive elements 41-1j to 41-Nj in the j-th column to the same signal line 42-j. The detection circuit 61-j in the j-th column outputs an analog signal having a voltage corresponding to the result of summing the currents to the differential circuit 131-j in the j-th column.

Here, in the first embodiment, each of the M detection circuits 61-1 to 61-M is configured using a capacitor. In the detection circuit 61-j in the j-th column, charge is accumulated in the capacitor by the currents output from the N variable resistive elements 41-1j to 41-Nj in the j-th column to the same signal line 42-j. The charge is proportional to the sum of the currents. The detection circuit 61-j in the j-th column outputs an analog signal having a voltage corresponding to the charge accumulated in the capacitor to the differential circuit 131-j in the j-th column as the analog signal having a voltage corresponding to the result of summing the currents. In the first embodiment, for the M detection circuits 61-1 to 61-M, capacitances of the capacitors of the respective detection circuits 61-1 to 61-M are the same.

The M detection circuits 61-1 to 61-M may be regarded as QV conversion circuits that convert a sum of the amounts of currents flowing through the respective signal lines (the signal line 42-j in the case of the detection circuit 61-j in the j-th column) to a voltage.

The differential circuit 131-j in the j-th column has a positive terminal (+ terminal) that is one input terminal, a negative terminal (− terminal) that is another input terminal, and an output terminal. The differential circuit 131-j in the j-th column receives, from the positive terminal, the analog signal output from the detection circuit 61-j in the j-th column, and receives, from the negative terminal, the analog signal output from the digital-to-analog converter 113. The differential circuit 131-j in the j-th column outputs a signal from the output terminal. The signal is the result of subtracting the input signal at the negative terminal from the input signal at the positive terminal The signal is output to the output terminal 151-j in the j-th column. The signal is an analog signal. In the first embodiment, the differential circuit 131-j in the j-th column outputs a signal having a voltage corresponding to a difference between voltages of the two input signals. In the first embodiment, the difference is a result of subtracting the input signal at the negative terminal from the input signal at the positive terminal.

The output terminal 151-j in the j-th column outputs the signal input from the differential circuit 131-j in the j-th column.

Here, the signal may be used for any purpose. As an example, the signal may be input to and used in a circuit (not shown) that uses a sum-of-products operation result in the neural network.

In the first embodiment, a case where a set of the detection circuits 61-1 to 61-M and the differential circuits 131-1 to 131-M is assigned to each of the M columns has been described, but it is not necessary for circuit sets that are the same in number as the columns to be included. For example, one detection circuit and one differential circuit can be assigned to each of M columns in a time division manner and multiplexed.

The control unit 15 controls the weight of each of the (N×M) variable resistive elements 41-11 to 41-NM. For example, the control unit 15 controls a value of a voltage applied to a control terminal of each of the variable resistive elements 41-11 to 41-NM or a magnetic field applied to each of the variable resistive elements 41-11 to 41-NM, to control the weight of each of the variable resistive elements 41-11 to 41-NM. The weight is regarded as a value corresponding to the conductance (or a value corresponding to resistance), and can be changed under the control of the control unit 15. The control unit 15 can change the weight of each of the variable resistive elements 41-11 to 41-NM to a desired value within a changeable range. Further, the control unit 15 may set any set value in the sum-of-products operator 1. Such a setting may be, for example, an initial setting or a setting for changing a preset value. The set value may include one or more parameters included in Equation (1) and Equation (2).

[Negative Weight in Array Unit]

In the sum-of-products operator 1 according to the first embodiment, it is possible to calculate so as to obtain the same operation result as when negative weights are used in the array of sum-of-products operation (or an operation result that is not the same as, but is correlated with the operation result when the negative weights are used in the array of sum-of-products operation; the same applies below) by correcting detection results of the respective detection circuits 61-1 to 61-M. That is, each of the (N×M) variable resistive elements 41-11 to 41-NM can have positive conductance (positive resistance value), but cannot have negative conductance (negative resistance value). Therefore, a negative weight cannot be expressed simply with the configuration of the array unit 12 according to the first embodiment. Therefore, in the first embodiment, it is possible to express a case where the negative weights are used by correcting the detection results of the respective detection circuits 61-1 to 61-M. In the first embodiment, a weight that can be expressed by the positive conductance (positive resistance value) is a positive weight (a weight having a positive value). A weight obtained by reversing a positive or negative sign of such a positive weight is the negative weight (the weight having a negative value).

[Specific Examples of Theoretical Values]

FIG. 2 is a diagram showing a specific example of theoretical values according to the first embodiment of the present invention.

FIG. 2 shows a table 2011 in which specific examples of theoretical values are described.

Content of the table 2011 will be described. In the table 2011, two cases, a Case 1 ("Case 1" in the table 2011) and a Case 2 ("Case 2" in the table 2011) are shown.

Case 1 will be described. In this example, the array unit 12 includes five (N=5) variable resistive elements 41-1$j$ to 41-5$j$ in the j-th column. In the table 2011, the five variable resistive elements 41-1$j$ to 41-5$j$ are indicated by "1" to "5" (i=1 to 5) indicating the number of rows. In the table 2011, a result of a sum of "1" to "5" is shown in "Sum". In the table 2011, the value of the input data is shown in "Input".

In the table 2011, an example of a numerical value when the weights having a positive value and the weights having a negative value are used and correction of the sum-of-products operation in the first embodiment is not performed is shown in "Calculation weight". In the "Calculation weight", values of the respective weights are shown in "Weight". In this example, the weight has a value in a range from –0.5 to +0.5. In the "Calculation weight", a result of a product of each of the five and input value, and a result of a sum of products (a field "Sum") are shown in "Sum-of-products operation".

In the table 2011, in a configuration where the weights having a positive value are used in the array unit 12 but the weights having a negative value are not used, examples of numerical values when the correction of the sum-of-products operation in the first embodiment is performed are shown in "Shift weight to positive value". In the "Shift weight to positive value", values of the weights after a shift of the five variable resistive elements 41-1$j$ to 41-5$j$ are shown in "Weight". In this example, a result of summing +0.5 to the "weight" in "Calculation weight" is the "weight" in the "Shift weight to positive value". That is, in this example, the weights of the five variable resistive elements 41-1$j$ to 41-5$j$ are shifted by +0.5, thereby taking values in a range from 0.0 to +1.0. Further, in the "Shift weight to positive value", a result of a product using the five variable resistive elements 41-1$j$ to 41-5$j$ and a result of sum of products thereof (the field "Sum") are shown in the "Sum-of-products operation". Information on such a weight shift may be set in the control unit 15 in advance, for example. That is, the control unit 15 may control the weights of the respective variable resistive elements 41-11 to 41-NM (in this example, the variable resistive elements 41-1$j$ to 41-5$j$) so that the shifted weights are obtained.

"1.55", which is a sum-of-products operation result (the field "Sum") of the "Sum-of-products operation" in the "Shift weight to positive value", is a shift by "1.25", which is a result of multiplying "2.5" that is a sum of the "Input" by ½, from "0.3" that is the sum-of-products operation result (the field "Sum") of the "Sum-of-products operation" in the "Calculation weight". That is, when a shift that is the reverse of such a shift (that is, a shift by "–1.25") is applied to "1.55" that is the sum-of-products operation result of the "Sum-of-products operation" in the "Shift weight to positive value", "0.3" that is the sum-of-products operation result of the "Sum-of-products operation" in the "Calculation weight" can be obtained. In the first embodiment, such a reverse shift is performed by the conversion unit 13 and the differential circuits 131-1 to 131-M. Information for performing such a reverse shift may be set in, for example, the adjustment circuit 112 and the digital-to-analog converter 113 of the conversion unit 13 in advance.

Thus, in a case where the weights having a negative value and the weights having a positive value are mixed, and when a predetermined value A1 (A1 is a predetermined positive value) is added to all the weights so that all the weights have a positive value, this can be an operation in a case where only weights having a positive value (or 0) exist. Further, it is possible to obtain the same operation result as the operation result in an original case, that is, the case where weights having a negative value and weights having a positive value are mixed, by subtracting a predetermined value B1 (B1 is a predetermined positive value) from result of such an operation.

The sum-of-products operator 1 according to the first embodiment uses such a principle. That is, the sum-of-products operation corresponding to the "Shift weight to positive value" is performed by the array unit 12. Further, the conversion unit 13 and the differential circuits 131-1 to 131-M perform correction for obtaining an operation result in an original case, that is, in a case where the weights having a negative value and the weights having a positive value are mixed. With the sum-of-products operator 1 according to the first embodiment, it is possible to obtain the operation result in which the weights having a negative value and the weights having a positive value are mixed, by executing the sum-of-products operation for the weight after conversion (weight after a shift) in an analog manner using the variable resistive elements 41-11 to 41-NM and performing correction on a result of the execution.

Case 2 in the table 2011 is described in the same way as Case 1. In Case 2, example of numerical values different from those in Case 1 are shown.

Here, Case 1 and Case 2 in the table 2011 represent, for example, a sum-of-products operation in a one-layer neural network having five-dimensional inputs ("1" to "5" in the table 2011). Information of the "Calculation weight" indicates information on a simulation result calculated by a calculator in a case where the weights having a negative value and the weights having a positive value are mixed. Information of the "Shift weight to positive value" indicates information on a simulation result calculated by the calculator in a case where the weight is shifted so that only the weight having a positive value (which may be 0) exists.

[Specific Example of a Value Simulation: Correction of Voltage]

FIG. 3 is a diagram showing a specific example (correction of a voltage) of a value simulation according to the first embodiment of the present invention. FIG. 3 shows a table 2021 in which a specific example (correction of a voltage) of a result of a simulation of values is described. Here, the example of FIG. 2 is a theoretical example, and the example of FIG. 3 is an example of simulated values. Therefore, in the example of FIG. 3, a numerical value deviating from a theoretical value can be taken. Further, a certain calculation error may occur due to the number of significant digits in calculation.

Content of the table 2021 will be described. In the table 2021, a Case 1 ("Case 1" in the table 2021) and a Case 2 ("Case 2" in the table 2021) as two cases are shown.

Case 1 will be described.

In this example, five (N=5) variable resistive elements 41-1$j$ to 41-5$j$ in the j-th column are included in the array unit 12. In the table 2021, the five variable resistive elements 41-1$j$ to 41-5$j$ are indicated by "1" to "5" (i=1 to 5) indicating the number of rows. In the table 2021, a result of a sum of "1" to "5" is shown in "Sum". In the table 2021, the value of the input data is shown in "Input". In this example, the range of the input data is a range from 0 to 1.

In the Table 2021, examples of numerical values when weights having a positive value and weights having a negative value are used and the correction of the sum-of-products operation in the first embodiment is not performed are shown in "Calculation in calculator". In the "Calculation in calculator", values of weights are shown in "Weight". In this example, a range of the weight is in a range from −1 to +1. Further, in the "Calculation in calculator", a result of the sum of products (a field "Sum") are shown in "Sum-of-products operation". In this example, the result of the sum-of-products operation is in a range from −5 to +5.

In the table 2021, in a configuration where the weights having a positive value are used in the array unit 12 but the weights having a negative value are not used, examples of numerical values when the correction of the sum-of-products operation in the first embodiment is performed are shown in "Calculation using neuromorphic array". In the "Calculation using neuromorphic array", "Input characteristics", "Element", "Array output", "Capacitance", "Voltage output", "Voltage correction", and "Normalization" are shown.

The "Input characteristics" indicate information on the input data. In the "Input characteristics", "Count value", "Pulse width (ns)", and "E (V)" are shown. The "Count value" indicates the value of the input data. In this example, the value corresponds to a value that determines a length (a pulse width) of a pulsed wave. "Pulse width" indicates a pulse width of an input signal that is a pulse width modulation signal. In this example, the "Pulse width" is, for example, 10 times the "counter value" when a unit pulse width is set to 10 (ns).

"E (V)" indicates a voltage of the input signal that is a pulse width modulation signal. In this example, the voltage is constant.

The "Element" indicates information on the variable resistive elements 41-1$j$ to 41-5$j$. In the "Element", "G (μS)" is shown. "G (μS)" indicates a value of a conductance of each of the five variable resistive elements 41-1$j$ to 41-5$j$. In this example, a range of the conductance is in a range from 1 (μS) to 2 (μS).

The "Array output" indicates an output from the array unit 12 and information on the detection circuit 61-$j$. In the "Array output", "I (μA)" and "Q (C)" are shown.

"I (μA)" indicates a current that is output from each of the five variable resistive elements 41-1$j$ to 41-5$j$. In this example, a range of each current is in a range from 0.2 (μA) to 0.4 (μA). In this example, the range of a sum value of the current is in a range from 1 (μA) to 2 (μA).

"Q (C)" indicates an amount of charge accumulated in the detection circuit 61-$j$.

The "Capacitance" indicates information on the detection circuit 61-$j$.

In the "Capacitance", "C (F)" is indicated.

"C (F)" indicates a capacitance of a capacitor constituting the detection circuit 61-$j$.

In the table 2021, the capacitance is shown in the field "Sum" for convenience.

The "Voltage output" indicates information on the detection circuit 61-$j$.

In the "Voltage output", "Output voltage (μV)" is shown. In this example, the range of the voltage output is in a range from 1275 (μV) to 2550 (μV).

"Output voltage (μV)" indicates a voltage output from the detection circuit 61-$j$.

In the table 2021, the voltage is shown in a field "Sum" for convenience.

The "Voltage correction" indicates information on the digital-to-analog converter 113 and the differential circuit 131-$j$.

In the "Voltage correction", "Δ" and "Output voltage (μV)" are shown.

"Δ" indicates the voltage of the analog signal that is output from the digital-to-analog converter 113 to the differential circuit 131-$j$.

"Output voltage (μV)" indicates a voltage that is output from the differential circuit 131-$j$.

In the table 2021, Δ and the voltage are shown in a field "Sum" for convenience.

The "Normalization" indicates information on normalization.

In "Normalization", "Value range: ±5" is shown.

"Value range: ±5" indicates a value obtained by normalizing the voltage and the value of ±5.

In the table 2021, the value is shown in a field "Sum", for convenience.

Here, calculation of "Δ" which is a voltage correction amount of "Voltage correction" is expressed by, for example, Δ={sum of lengths of pulses of input signal (s)}× (average current amount)/(detection capacitance) or an equation obtained by including one or more coefficients therein. As the coefficients, for example, one or both of a gain coefficient and a shift coefficient may be used.

Further, in the normalization, normalization according to the result of the sum-of-products operation is performed.

In this example, a range from −1275 (μV) to +1275 (μV) that is a range of a voltage after correction corresponds to −5 to +5, which is a range of a result of the sum-of-products operation. Therefore, an operation of the "Normalization" is expressed by a value of a result of normalization=(voltage after correction)/{2550 (μV)/2}×5.

Case 2 in the table 2021 is described in the same way as Case 1. In Case 2, examples of numerical values different from those in Case 1 are shown.

For example, a predetermined set value is set in the sum-of-products operator 1 and the control unit 15 according to the first embodiment so that an operation according to the numerical values as shown in Case 1 in the table 2021 is performed, thereby realizing the operation as shown in Case 1 in the table 2021.

Further, the numerical values shown in Case 1 in the table 2021 are only examples, and operations according to various other numerical values can be realized by the sum-of-products operator 1.

[Specific Example of a Value Simulation: Correction of Amount of Charge]

FIG. 4 is a diagram showing a specific example (correction of the amount of charge) of a value simulation according to the first embodiment of the present invention.

FIG. 4 shows a table 2031 in which a specific example (correction of the amount of charge) of the result of a simulation of values is described.

Here, the correction of the voltage has been described in the example of FIG. 3, whereas the correction of the amount of charge will be described in the example of FIG. 4.

In the example of FIG. 4, it is assumed that the amount of charge accumulated in the detection circuit 61-$j$ in the j-th column is corrected.

As an example, in the sum-of-products operator 1, a circuit that performs detection and correction of a sum (charge amount) of the currents in the j-th column is included instead of the combination of the detection circuit 61-$j$ in the j-th column and the differential circuit 131-$j$ in the j-th column, and the circuit accumulates the current flowing through the signal line 42-$j$ in the j-th column, subtracts the amount of charge corresponding to a voltage output from the conversion unit 13 from a sum (the amount of charge) of the accumulated current, and outputs a signal having a voltage corresponding to a result of the subtraction to the output terminal 151-$j$ in the j-th column, thereby realizing the correction of the amount of charge.

Content of the table 2031 will be described.

A detailed description of the same parts as those of the table 2021 shown in FIG. 3 is omitted.

In the table 2031, a Case 1 ("Case 1" in the table 2031) and a Case 2 ("Case 2" in the table 2031) as two cases are shown.

Case 1 will be described.

In this example, five (N=5) variable resistive elements 41-$1j$ to 41-$5j$ in the j-th column are included in the array unit 12. In the table 2031, the five variable resistive elements 41-$1j$ to 41-$5j$ are indicated by "1" to "5" (i=1 to 5) indicating the number of rows. In the table 2031, a result of a sum of "1" to "5" is shown in "Sum".

"Input" in the table 2031 indicates the same information as in the case of the table 2021 shown in FIG. 3. In the table 2031, an example of a numerical value when a weight having a positive value and a weight having a negative value are used and correction of the sum-of-products operation is not performed is shown in "Calculation in calculator". "Weight" and "Sum-of-products operation" of the "Calculation in calculator" in the table 2031 indicate the same information as in the table 2021 shown in FIG. 3.

In the table 2031, in a configuration where the weights having a positive value are used in the array unit 12 but the weights having a negative value are not used, examples of numerical values when the correction of the sum-of-products operation in the first embodiment is performed are shown in "Calculation using neuromorphic array". In the "Calculation using neuromorphic array", "Input characteristics", "Element", "Array output", "Charge amount correction", "Capacitance", "Voltage output", and "Normalization" are shown.

In the table 2031, "Count value", "Pulse width (ns)" and "E (V)" of the "Input characteristics", "G (μS)" of "Element", "I (μA)" and "Q (C)" of the "Array output", "C (F)" of the "Capacitance", and "Normalization" indicate the same information as in the case of the table 2021 shown in FIG. 3.

In the table 2031, the "Charge amount correction" indicates information on the correction of the amount of charge. In the "Charge amount correction", "Δ" and "Q after correction" are shown. "Δ" indicates a sum (charge amount) of currents of analog signals output from the digital-to-analog converter 113. "Q after correction" indicates the amount of charge after correction.

In the table 2031, "Voltage output" indicates information on the voltage output from the output terminal 151-$j$. In the "Voltage output", "Output voltage (μV)" is shown. The "Output voltage (μV)" indicates a value of the voltage output from the output terminal 151-$j$.

Even when correction of the amount of charge is performed as shown in the table 2031, it is possible to realize a sum-of-products operation in which weights having a positive value and weights having a negative value are mixed, as in a case where the correction of the voltage is performed as shown in the table 2021.

[Other Examples of Input Signals]

Although a case where the pulse width modulation signals are generated by the input signal generation circuits 32-1 to 32-N has been described in the first embodiment, an amplitude modulation signal may be generated in another example. In this case, each of the N input signal generation circuits 32-1 to 32-N generates, as an input signal, an amplitude modulation signal having an amplitude corresponding to the value of the input data. In this case, a height of a waveform of the amplitude modulation signal corresponds to the count value of the input registers 31-1 to 31-N.

Here, results of integrating the amplitude with respect to time (width) have a correlation between a case where the pulse width modulation signal is generated as the input signal and a case where the amplitude modulation signal is generated as the input signal. For example, it is possible to obtain the same integration result of time (width) and amplitude in: the case of the pulse width modulation signal being generated as an input signal; and the case of the amplitude modulation signal being generated as an input signal, by adjusting coefficients or the like when the input signal is generated by the respective input signal generation circuit 32-1 to 32-N.

Further, in recent years, in neuromorphic computing that imitates an information processing mechanism of a brain, a spiking scheme has attracted attention as a method of more faithfully imitating signal propagation in a synapse of the brain. In the spiking scheme, an input signal is expressed as a frequency of a pulse signal, and synaptic coupling amplifies or suppresses input pulse frequency information using a function of each inhibitory or excitatory synapse and outputs resultant information. A neuron receives a plurality of these synaptic outputs, and imitation is performed so that an activation state in the neuron is increased or decreased on the basis of a time-series signal thereof. A pulse is output (fired) to a next stage at the moment when the activation state of each neuron exceeds a threshold value. The first embodiment is also applicable to expressing an inhibitory synapse in such a modeling method (modulation method). That is, the input signal generation circuits 32-1 to 32-N may generate a signal modulated with the number of pulses per unit time, that is, a pulse frequency (a pulse frequency modulation signal).

The frequency of the pulse signal may be regarded as the density of the pulse signal.

Here, a spiking neural network (SNN) is similar to a deep learning (deep neural network) technology in that a brain is imitated as a graph structure, but is different in a neuron model in which a certain signal is input and output (coded) to and from synaptic coupling.

In the SNN, a spike signal and a firing model are used in order to perform imitation close to a propagation model of a neuron membrane potential of cranial nerve cells or an ion channel opening of the synaptic coupling. When the SNN is digitally mounted, there is an implementation method of performing modulation with a frequency of pulses. When the SNN is mounted in an analog manner, there is a mounting method in which a charging and discharging element using an integrator or a capacitor (C) is combined.

Figure 6:
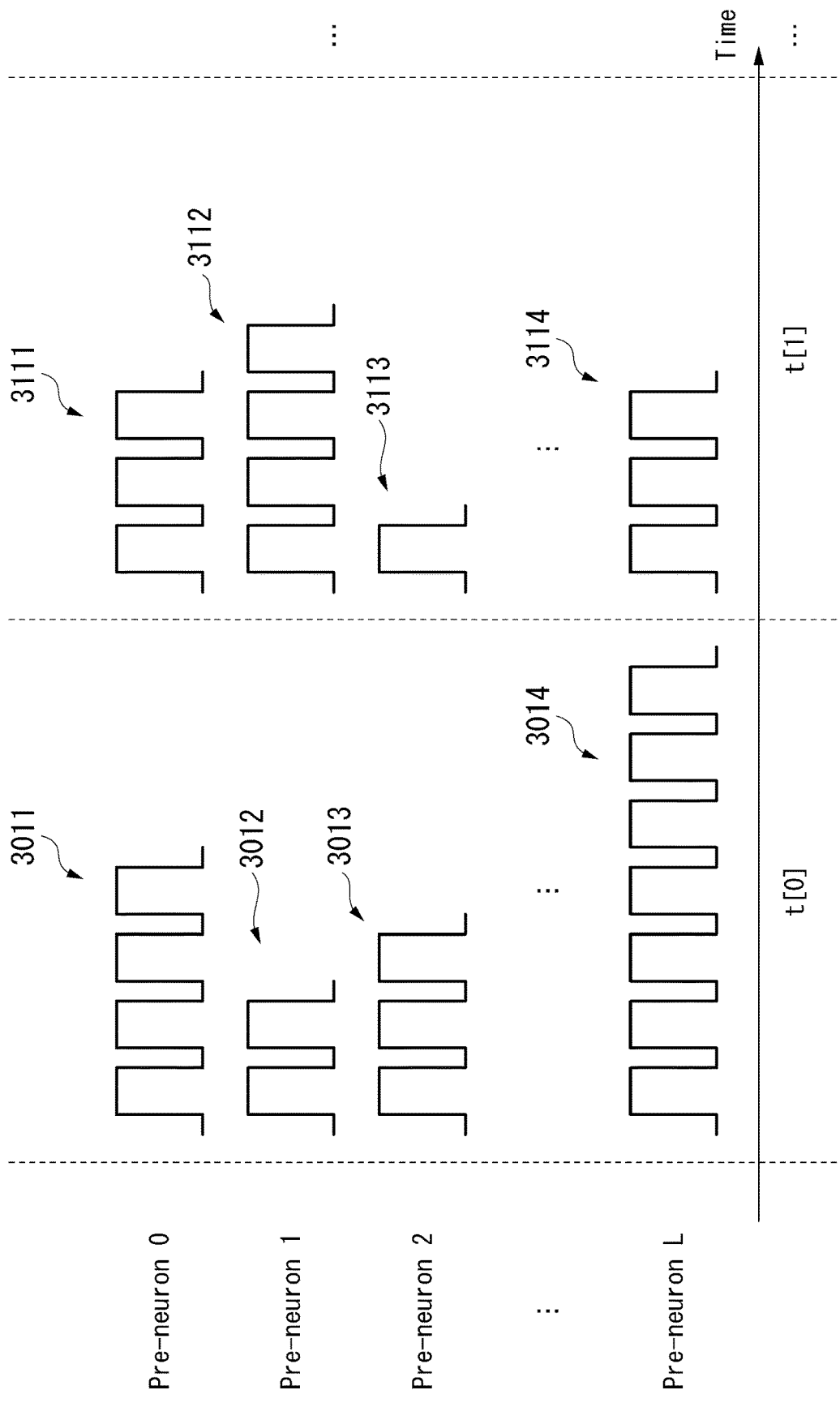
FIG. 6 is a diagram showing a specific example of a pulse frequency modulation signal according to the embodiment of the present invention.

FIG. 6 is a diagram showing a specific example of the pulse frequency modulation signal according to the first embodiment of the present invention. In a graph shown in FIG. 6, a horizontal axis indicates time, and a vertical axis indicates a plurality of (L+1) pulse frequency modulation signals side by side. In the example of FIG. 6, the (L+1) pulse frequency modulation signals correspond to (L+1) pre-neurons including 0th to Lth pre-neurons.

Here, L is an integer equal to or greater than 1.

Time t[0], time t[1], . . . indicate a time, and this indicates that time advances as a numerical value in [ ] increases.

In the example of FIG. 6, the number of pulses that the pulse frequency modulation signal has at each single time, such as time t[0] or time t[1], indicates the value of the data.

As a specific example, at time t[0], the value of the data corresponding to the pulse frequency modulation signal 3011 is 4, the value of the data corresponding to the pulse frequency modulation signal 3012 is 2, the value of the data corresponding to the pulse frequency modulation signal 3013 is 3, and the value of the data corresponding to the pulse frequency modulation signal 3014 is 7.

Similarly, at time t[1], the value of the data corresponding to the pulse frequency modulation signal 3111 is 3, the value of the data corresponding to the pulse frequency modulation signal 3112 is 4, the value of the data corresponding to the pulse frequency modulation signal 3113 is 1, and the value of the data corresponding to the pulse frequency modulation signal 3114 is 3.

Figure 7:
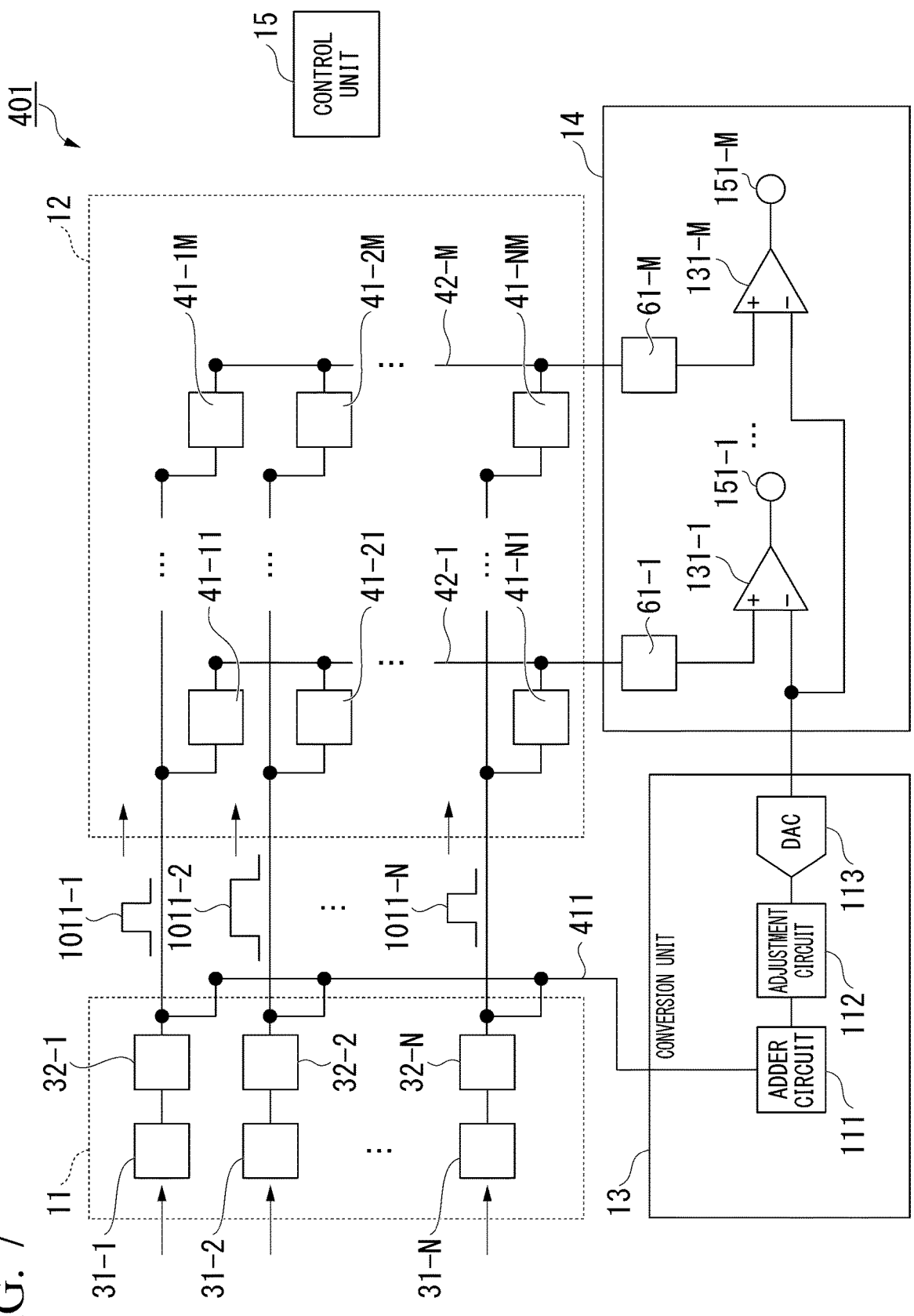
FIG. 7 is a diagram showing a modification example of the sum-of-products operator according to the embodiment of the present invention.

When the SNN can be used and an integrated value of a plurality of values (for example, output values from the plurality of variable resistive elements 41-11 to 41-N1, output values from the plurality of variable resistive elements 41-12 to 41-N2, . . . , output values from the plurality of variable resistive elements 41-1M to 41-NM in the example of FIGS. 1 and 7) exceeds a threshold value, a digital spike signal is output.

[Other Examples of Target of Input to Adder Circuit]

FIG. 7 is a diagram showing a modification example of the sum-of-products operator 401 according to the first embodiment of the present invention. The sum-of-products operator 401 shown in FIG. 7 includes a signal line 411 instead of the signal line 33 shown in FIG. 1, unlike the sum-of-products operator 1 shown in FIG. 1. In the sum-of-products operator 401 shown in FIG. 7, the same components as those of the sum-of-products operator 1 shown in FIG. 1 are denoted by the same reference signs, for convenience of description.

The data output from each of the N input signal generation circuits 32-1 to 32-N is also transmitted to the adder circuit 111. In the first embodiment, the data output from each of the N input signal generation circuits 32-1 to 32-N is input to the same signal line 411 and transmitted to the adder circuit 111 via the signal line 411.

A configuration where data output from the input registers 31-1 to 31-N is transmitted to the adder circuit 111 as in the example of FIG. 1 may be used, or a configuration where the data output from the input signal generation circuits 32-1 to 32-N is transmitted to the adder circuit 111 as in the example of FIG. 7 may be used. For example, content of the operation that is performed by the conversion unit 13 (for example, the adjustment circuit 112) may be different depending on which of these configurations is used.

Here, these configurations may be used, for example, in a case where modulation schemes of signals output from the input signal generation circuits 32-1 to 32-N are various modulation schemes.

Thus, the input signal to the adder circuit 111 may be, for example, a signal before modulation or may be a signal after modulation. Further, which of these configurations is used does not depend on, for example, the modulation scheme.

[Other Examples of Adjustment Circuit in the Conversion Unit]

Although the adder circuit 111, the adjustment circuit 112, and the digital-to-analog converter 113 are included in the conversion unit 13 in the first embodiment, the adjustment circuit 112 may not be included in another example. For example, when accuracy enough to be practically acceptable is obtained even when the adjustment in the adjustment circuit 112 is not performed, the adjustment circuit 112 may not be included. That is, the conversion unit 13 may include an adder circuit 111 and a digital-to-analog converter 113, and an output from the adder circuit 111 may be input to the digital-to-analog converter 113. For example, in a case where sufficient accuracy cannot be obtained unless the adjustment in the adjustment circuit 112 is performed, a configuration where the adjustment circuit 112 is included is preferable. For example, a mechanism that dynamically corrects an actual device manufacturing variation, circuit temperature drift, and the like may be provided in the adjustment circuit 112.

[Conclusion of First Embodiment]

As described above, with the sum-of-products operator 1 according to the first embodiment, it is possible to easily realize a sum-of-products operation in which weights having a positive value and weights having a negative value are mixed. The sum-of-products operator 1 according to the first embodiment performs the sum-of-products operation using an analog scheme. With the sum-of-products operator 1 according to the first embodiment, it is possible to express a negative weight by correcting the result of the sum-of-products operation in the array unit 12 and the detection circuits 61-1 to 61-M. Accordingly, with the sum-of-products operator 1, it is possible to express, for example, one weight having a positive or negative value for each of the variable resistive elements 41-11 to 41-NM.

In the first embodiment, preferably, an element in which characteristics of change in value of a conductance have symmetry can be used as the variable resistive elements 41-11 to 41-NM. The element may be, for example, an element in which spin symmetry is used.

Further, a neuromorphic element in the related art is an element in which characteristics of change in value of a conductance have no symmetry. Therefore, in the related art, it was essentially assumed that two such elements are used. Alternatively, when such an operation mechanism is configured using elements having poor symmetry, there is a problem that control for appropriately setting positive and negative weight values in asymmetric conductance of the elements becomes complicated. On the other hand, an element in which characteristics of change in value of a conductance have symmetry has been realized in recent years. Accordingly, in the present application, it can be considered that such an element is used to express a sum-of-products operation in which weights having a positive value and weights having a negative value are mixed. This means that the technical problem triggering the formulation of the sum-products operator 1, which is related to the present embodiment, has not been existed in the above-described related arts; and the technical problem of the present invention has been recognized for the first time.

[Configuration Example]

An example of a configuration of the sum-of-products operator 1 or the like is shown. The present invention is not limited to the following example of the configuration.

The sum-of-products operator 1 according to the first embodiment includes a first circuit (the input signal generation circuits 32-1 to 32-N in the example of FIG. 1), a second circuit (a circuit of the array unit 12 and the detection circuits 61-1 to 61-M in the example of FIG. 1), a third circuit (a circuit of the conversion unit 13 in the example of FIG. 1), and a fourth circuit (which is the differential circuits 131-1 to 131-M in the example of FIG. 1, and may include the output terminals 151-1 to 151-M). The second circuit includes a first operation circuit (the variable resistive elements 41-1$j$ to 41-N$j$, the signal line 42-$j$, and the detection circuit 61-$j$ in the j-th column for any j corresponding to one or more rows in the example of FIG. 1). The fourth circuit includes a differential circuit (the differential circuit 131-$j$ in the j-th column for any j corresponding to one or more rows in the example of FIG. 1). The first circuit generates a plurality of signals (the input signals in the example of FIG. 1), each of which corresponds to each of a plurality of data (the input data in the example of FIG. 1). The first operation circuit of the second circuit multiplies each of the signals generated by the first circuit by the weight using a plurality of variable resistive elements having variable resistance values (the variable resistive elements 41-1$j$ to 41-N$j$ in the j-th column for any j corresponding to one or more rows in the example of FIG. 1), and calculates a sum of a plurality of results of multiplication (an output from the detection circuit 61-$j$ in the j-th column for any j corresponding to one or more rows in the example of FIG. 1). The third circuit calculates a result of summing values corresponding to the data (count values corresponding to the input data in the example of FIG. 1) (a conversion result when it is assumed that the output from the adder circuit 111 itself is converted by the digital-to-analog converter 113 in the example of FIG. 1) or a result of the summing value after being adjusted (a result of converting the output from the adjustment circuit 112 using the digital-to-analog converter 113 in the example of FIG. 1).

The differential circuit of the fourth circuit outputs a difference between a calculated result in the first operation circuit of the second circuit and a calculated result in the third circuit. Therefore, in the sum-of-products operator 1 according to the first embodiment, it is possible to eliminate, for example, necessity for dividing the elements (the variable resistive elements 41-11 to 41-NM in the example of FIG. 1) for each of positive and negative weights of the neural network by subtracting correction values (an output from the digital-to-analog converter 113 in the example of FIG. 1) calculated on the basis of a sum of the input data from the outputs from the detection circuits 61-1 to 61-M.

In the sum-of-products operator 1 according to the first embodiment, a result to be calculated in the first operation circuit of the second circuit and a result to be calculated in the third circuit are analog signals. The differential circuit of the fourth circuit is an analog circuit. Therefore, the sum-of-products operator 1 according to the first embodiment can perform correction of the sum-of-products operation through an analog operation.

In the sum-of-products operator 1 according to the first embodiment, a common variation range of conductance is set in the variable resistive elements. The first operation circuit of the second circuit has capacitance for acquiring the sum of results of multiplication (in the example of FIG. 1, capacitance of a capacitor constituting the detection circuit 61-$j$ in the j-th column for any j corresponding to one or more rows). A result to be calculated in the third circuit is a result of multiplying (a result obtained by summing values corresponding to the data), (a central value of the common variation range of the conductance of the variable resistive elements), and {1/(capacitance)}. Therefore, with the sum-of-products operator 1 according to the first embodiment, it is possible to perform the correction of the sum-of-products operation using an analytical correction value through a theoretical correction value as shown in Equation (1).

In the sum-of-products operator 1 according to the first embodiment, the common variation range of conductance in the variable resistive elements is set. The first operation circuit of the second circuit has capacitance for acquiring the sum of results of multiplication. The result to be calculated in the third circuit corresponds to a sum of a result of multiplying a product of (the result of summing the values corresponding to the data), (a central value of the common variation range of the conductance of the variable resistive elements), and {1/(the capacitance)} by a first coefficient (K1 in the example of Equation (2)), and a second coefficient (K2 in the example of Equation (2)). Therefore, the sum-of-products operator 1 according to the first embodiment can perform the correction of the sum-of-products operation using the analytical correction value through a theoretical operation as shown in Equation (2). In this case, for example, an element that corrects variation in circuit mounting, a temperature variation, or the like can be included in the analytical correction value using a predetermined coefficient. Accordingly, with the sum-of-products operator 1, it is possible to suppress a variation due to, for example, analog implementation, and temperature or process-dependent characteristics.

With the sum-of-products operator 1 according to the first embodiment, the first circuit generating the signals corresponding to the data is performed by the first circuit generating a pulse width modulation signals, each of which corresponds to the data. Therefore, with the sum-of-products operator 1 according to the first embodiment, when the pulse width modulation signal is generated by the input signal generation circuits 32-1 to 32-N, it is possible to perform the correction of the sum-of-products operation using a correction value based on a sum value of pulse widths of N input signals.

With the sum-of-products operator 1 according to the first embodiment, the first circuit generating the signals corresponding to the data is performed by the first circuit generating an amplitude modulation signals, each of which corresponds to the data. Therefore, with the sum-of-products operator 1 according to the first embodiment, when the amplitude modulation signal is generated by the input signal generation circuits 32-1 to 32-N, it is possible to perform the correction of the sum-of-products operation using a correction value based on a sum value of amplitudes of the N input signals.

In the sum-of-products operator 1 according to the first embodiment, the second circuit includes a plurality of (generally, M in the example of FIG. 1) first operation circuits.

The fourth circuit includes differential circuits (generally, M differential circuits 131-1 to 131-M in the example of FIG. 1) for each of the first operation circuits. Therefore, in the sum-of-products operator 1 according to the first embodiment, the output from one conversion unit 13 is input to each of the M differential circuits 131-1 to 131-M. That is, the output from one conversion unit 13 is reflected in the outputs of the plurality of signal lines 42-1 to 42-M constituting the array unit 12. With such a configuration, it is possible to reduce a circuit scale of the sum-of-products operator 1, for example, as compared with a case where a conversion unit (a functional unit corresponding to the conversion unit 13) is included for each of the plurality of signal lines 42-1 to 42-M constituting the array unit 12.

In the sum-of-products operator 1 according to the first embodiment, the data are input to the third circuit in a time series order. The third circuit is configured to sum values corresponding to the data in the time series order. Therefore, in the sum-of-products operator 1 according to the first embodiment, when data output from the plurality of input registers 31-1 to 31-N is input to the adder circuit 111 via the signal line 33 in a time series order order, the adder circuit 111 can add these data in order. In this case, it is possible to simplify a configuration of the adder circuit 111, as compared with, for example, a case where timing control or the like is performed when addition of a plurality of data is performed.

In the sum-of-products operator 1 according to the first embodiment, the variable resistive elements are magnetoresistive effect elements that exhibits a magnetoresistive effect. Therefore, in the sum-of-products operator 1 according to the first embodiment, as a preferable aspect, magnetoresistive effect elements may be used as the variable resistive elements 41-11 to 41-NM. Accordingly, in the sum-of-products operator 1, it becomes easy for the weights having a positive value and the weights having a negative value to be expressed.

In the first embodiment, it is possible to implement a sum-of-products operation method that is the same as the process that is performed by the sum-of-products operator 1 according to the first embodiment. Accordingly, with the sum-of-products operation method according to the first embodiment, it is possible to obtain the same effects as described for the sum-of-products operator 1 according to the first embodiment.

In the first embodiment, it is possible to implement a logical operation device that includes the sum-of-products operator 1 according to the first embodiment and executes a logical operation. Accordingly, with the logical operation device according to the first embodiment, it is possible to improve the performance of a logical operator through, for example, a sum-of-products operation with less error. Further, any operation may be performed as the logical operation.

In the first embodiment, it is possible to implement a neuromorphic device using the neuromorphic elements as the variable resistive elements 41-11 to 41-NM, including the sum-of-products operator 1 according to the first embodiment. Accordingly, with the neuromorphic device according to the first embodiment, it is possible to improve the performance of the neuromorphic device through, for example, a sum-of-products operation with less error.

In the neuromorphic device, any operation may be performed.

Here, the neuromorphic device is a device for performing a neuromorphic operation, and performs, for example, an operation of imitating a motion of a brain. The neuromorphic device may be, for example, a device that is a combination of circuits such as an array or may be a device constituting a neural network. Using a neural network technology, it is possible to identify or classify advanced information. Such a neural network technology has been put into practical use in a wide range of fields such as deep learning, medical care, healthcare, finance, marketing, authentication, and security.

(Second Embodiment)
[Configuration of Sum-of-Products Operator]

Figure 5:
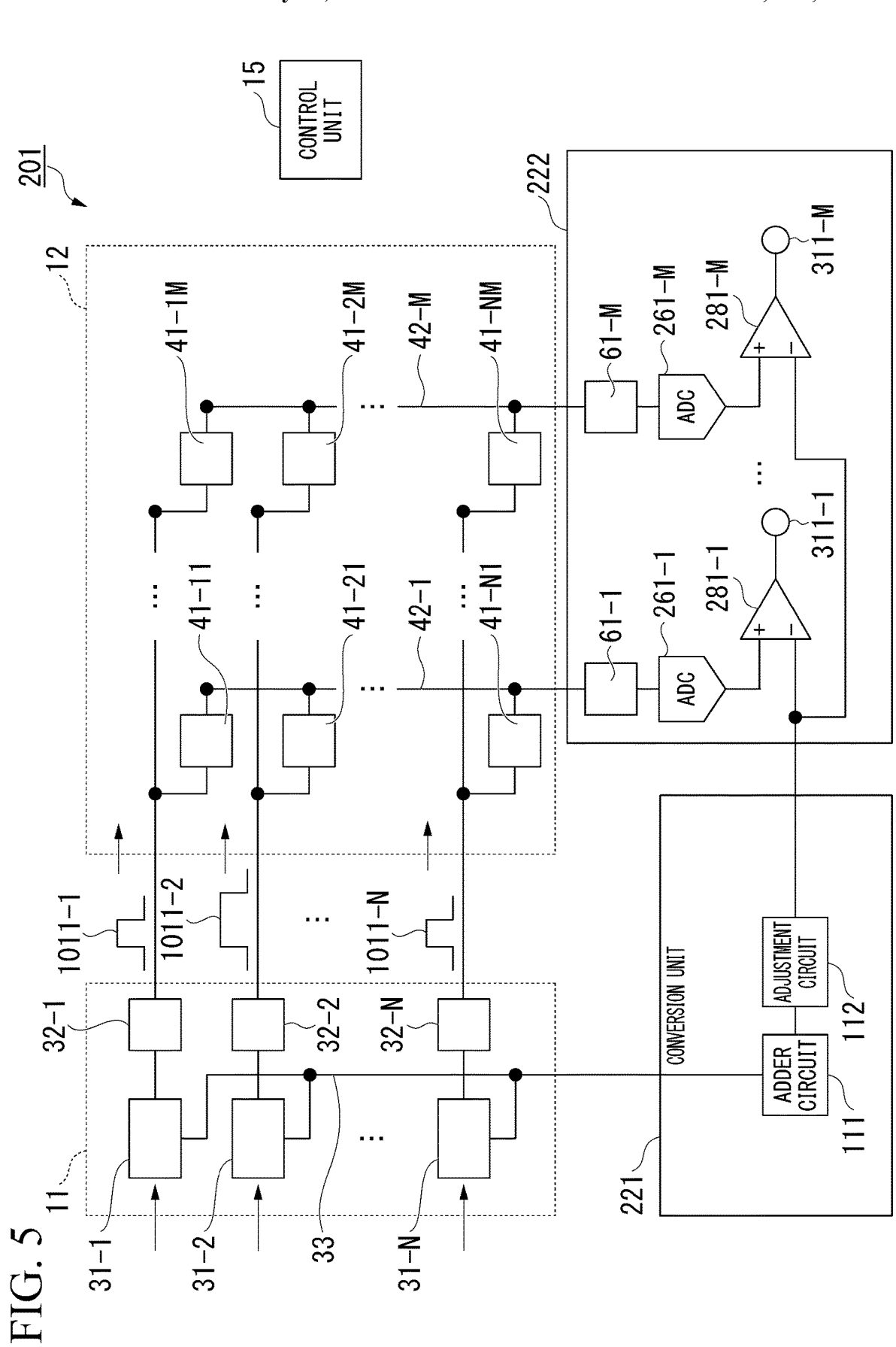
FIG. 5 is a diagram showing a schematic configuration of a sum-of-products operator according to an embodiment (a second embodiment) of the present invention.

FIG. 5 is a diagram showing a schematic configuration of a sum-of-products operator 201 according to an embodiment (a second embodiment) of the present invention. In the second embodiment, the same components as those of the sum-of-products operator 1 shown in FIG. 1 according to the first embodiment will be described with the same reference numerals, and a detailed description thereof will be omitted. Further, in the second embodiment, i and j used in the description of the first embodiment will be used for convenience of description.

The sum-of-products operator 201 includes an input unit 11, an array unit 12, a conversion unit 221, and an output unit 222.

Further, FIG. 5 shows a control unit 15 that controls the sum-of-products operator 201. In the second embodiment, the control unit 15 is configured as a functional unit different from the sum-of-products operator 201. In this case, the sum-of-products operator 201 and the control unit 15 may be regarded as being included in, for example, a predetermined device (for example, a sum-of-products operation device) or a predetermined system (for example, a sum-of-products operation system). As another example, the control unit 15 may be configured integrally with the sum-of-products operator 201. In this case, the sum-of-products operator 201 may be regarded as including the control unit 15.

Here, the input unit 11, the array unit 12, and the control unit 15 are the same components as those of the sum-of-products operator 1 shown in FIG. 1 according to the first embodiment. A way of control that is performed by the control unit 15, for example, may be different between the sum-of-products operator 1 shown in FIG. 1 according to the first embodiment and the sum-of-products operator 201 according to the second embodiment.

In the second embodiment, the conversion unit 221 and the output unit 222 will be described in detail.

The conversion unit 221 includes an adder circuit 111 that is the same as that shown in FIG. 1 according to the first embodiment and an adjustment circuit 112 that is the same as that shown in FIG. 1 according to the first embodiment.

The output unit 222 includes M detection circuits 61-1 to 61-M that are the same as those shown in FIG. 1 according to the first embodiment, and M analog-to-digital converters (ADC) 261-1 to 261-M, M differential circuits 281-1 to 281-M, and M output terminals 311-1 to 311-M.

Each of the M differential circuits 281-1 to 281-M may be, for example, a logic circuit that calculates a difference.

The detection circuits 61-1 to 61-M, the differential circuits 281-1 to 281-M, and the analog-to-digital converters 261-1 to 261-M are assigned, as a set of circuits, to each of the M columns for description, but it is not always necessary for circuit sets that are the same in number as the columns to be included. For example, one detection circuit, one differential circuit, and one analog-to-digital converter can be assigned to each of the M columns in a time division manner and multiplexed.

[Function and Action of Each Circuit in Sum-of-Products Operator]

An example of a function and action of each circuit in the sum-of-products operator 201 will be described. A configuration and action of the conversion unit 221 differ from the configuration and action of the conversion unit 13 shown in FIG. 1 according to the first embodiment in that the digital-to-analog converter 113 of the conversion unit 13 is not included.

The conversion unit 221 outputs digital data of an adjustment result that is output from the adjustment circuit 112 to each of the M differential circuits 281-1 to 281-M. The digital data corresponds to the digital data that is output from the adjustment circuit 112 to the digital-to-analog converter 113 in the conversion unit 13 shown in FIG. 1 according to the first embodiment.

The analog digital converter 261-$j$ in the j-th column receives the analog signal output from the detection circuit 61-$j$ in the j-th column. The analog-to-digital converter 261-$j$ in the j-th column converts the input analog signal into digital data, and outputs the converted digital data to the differential circuit 281-$j$ in the j-th column.

The differential circuit 281-$j$ in the j-th column has a positive terminal (+ terminal) that is one input terminal, a negative terminal (− terminal) that is another input terminal, and an output terminal. The differential circuit 281-$j$ in the j-th column receives, from the positive terminal, the digital data output from the analog-to-digital converter 261-$j$ in the j-th column, and receives, from the negative terminal, the digital data output from the adjustment circuit 112. The differential circuit 281-$j$ in the j-th column outputs, from the output terminal, data of a result of subtracting the input data at the negative terminal from the input data at the positive terminal. The data is output to the output terminal 311-$j$ in the j-th column. In the second embodiment, the differential circuit 281-$j$ in the j-th column outputs data indicating a difference between the two pieces of input data. The difference may be indicated by a voltage value, for example. In the second embodiment, the difference is the result of subtracting the input data at the negative terminal from the input data at the positive terminal.

The output terminal 311-$j$ in the j-th column outputs the data input from the differential circuit 281-$j$ in the j-th column. Here, the data may be used for any purpose. As an example, the data may be input to and used in a circuit (not shown) that uses the sum-of-products operation result in the neural network.

Further, for example, a digital-to-analog converter in the j-th column (not shown) may be included between the differential circuit 281-$j$ in the j-th column and the output terminal 311-$j$ in the j-th column. In this case, the digital-to-analog converter in the j-th column receives the digital data output from the differential circuit 281-$j$ in the j-th column, converts the input digital data into an analog signal, and outputs the converted analog signal to the output terminal 311-$j$ in the j-th column. In this case, the output terminal 311-$j$ in the j-th column outputs the analog signal input from the digital-to-analog converter in the j-th column.

[Conclusion of Second Embodiment]

As described above, with the sum-of-products operator 201 according to the second embodiment, it is possible to perform the same operation as in the sum-of-products operator 1 according to the first embodiment, and to obtain the same effects except for a difference in effects due to the differences with the sum-of-products operator 1 according to the first embodiment. Therefore, with the sum-of-products operator 201 according to the second embodiment, for example, it is possible to easily realize a sum-of-products operation in which weights having a positive value and weights having a negative value are mixed.

[Configuration Example]

The sum-of-products operator 201 according to the second embodiment includes a first circuit (the input signal generation circuits 32-1 to 32-N in the example of FIG. 5), a second circuit (a circuit of the array unit 12, the detection circuits 61-1 to 61-M, and the analog-to-digital converters 261-1 to 261-M, in the example of FIG. 5), a third circuit (a circuit of the conversion unit 221 in the example of FIG. 5), and a fourth circuit (which is the differential circuits 281-1 to 281-M in the example of FIG. 5, and may include the output terminals 311-1 to 311-M). The second circuit includes a first operation circuit (the variable resistive elements 41-1$j$ to 41-N$j$, the signal line 42-$j$, the detection circuit 61-$j$, and the analog-to-digital converter 261-$j$ in the j-th column for any j corresponding to one or more rows in the example of FIG. 5). The fourth circuit includes a differential circuit (the differential circuit 281-$j$ in the j-th column for any j corresponding to one or more rows in the example of FIG. 5). The first circuit generates a plurality of signals (the input signal in the example of FIG. 5), each of which corresponds to each of a plurality of data (the input data in the example of FIG. 5). The first operation circuit of the second circuit multiplies each of the signals generated by the first circuit by the weight using a plurality of variable resistive elements having variable resistance values (the variable resistive elements 41-1$j$ to 41-N$j$ in the j-th column for any j corresponding to one or more rows in the example of FIG. 5) to calculate the sum of a plurality of results of multiplications (an output from the detection circuit 61-$j$ in the j-th column for any j corresponding to one or more rows in the example of FIG. 5). The third circuit calculates a result of summing values corresponding to data (count values corresponding to the input data in the example of FIG. 5) (an output when it is assumed that the output from the adder circuit 111 itself is output from the adjustment circuit 112 in the example of FIG. 5) or a result of summing value after being adjusted (an output from the adjustment circuit 112 in the example of FIG. 5). The differential circuit of the fourth circuit outputs a difference between a calculated result in the first operation circuit of the second circuit and a calculated result in the third circuit. Therefore, in the sum-of-products operator 201 according to the second embodiment, it is possible to eliminate, for example, necessity for dividing the elements (the variable resistive elements 41-11 to 41-NM in the example of FIG. 5) for each of positive and negative weights of the neural network by subtracting values (an output from the adjustment circuit 112 in the example of FIG. 5) calculated on the basis of a sum of the input data from the outputs from the detection circuits 61-1 to 61-M (a result of converting the output in the analog-to-digital converters 261-1 to 261-M in the example of FIG. 5).

Here, although a case where the analog-to-digital converters 261-1 to 261-M are included in the second circuit has been described, the analog-to-digital converters 261-1 to 261-M may be regarded as being included in the third circuit as another example. That is, the analog-to-digital converters 261-1 to 261-M may be regarded as circuits for adjusting correction values, similar to the digital-to-analog converter 113 shown in FIG. 1 according to the first embodiment.

In the sum-of-products operator 201 according to the second embodiment, a result to be calculated in the first operation circuit of the second circuit and a result to be calculated in the third circuit are digital data. The differential circuit of the fourth circuit is a digital circuit. Therefore, the sum-of-products operator 201 according to the second embodiment can perform correction of the sum-of-products operation through a digital operation by converting an output of the array unit 12 to digital data.

(Conclusion of Above Embodiments)

The sum-of-products operators 1 and 201 as described above, or a neuromorphic device using the same can be allowed to function as various sensors or brains of robots. When a signal output from a sensor is input to a control device using this neuromorphic device, the neuromorphic device can be allowed to function as an edge element. A sensor signal generally has a lot of noise, and a general sensor module cannot extract a desired sensor signal from the noise. Therefore, a method of removing noise from a time series signal of the sensor signal, for example, using a signal processing technology, and extracting a desired signal can be taken. In this case, signals other than an obtained signal are merely energy consumption and do not generate information. By inputting the sensor signal to the control device using the neuromorphic device, it is possible to perform highly accurate recognition. In the related art, an observation signal in which noise has been superimposed on a source signal is separated into the source signal and the noise, meaningful information is extracted for the first time, but with this control device, it is possible to predict a desired source signal from a time-series signal including the noise and to extract a meaningful signal even when an output intensity or a statistical value of the source signal is small. This is a module in which the sensor and the control device are integrated, and can be an AI edge sensor module. With this control device, it is possible to extract information with a small amount of calculation function as compared with the related art since recognition accuracy becomes high, and to achieve low costs, low power consumption, and a small volume.

It is also preferable for signals of a plurality of sensors to be input to the control device simultaneously. It is possible to obtain recognition regarding relevance among the sensors by inputting the signals of the plurality of sensors simultaneously. For example, when sensors are installed on hands, feet, and a torso of a robot and signals from the sensors are input to the controller simultaneously, information such as whether the robot is walking or has fallen is complexly determined on the basis of the signals. Further, in a robot, a car, or the like in which a plurality of AI edge sensor modules have been installed, signals are simultaneously input to the control device such that low power consumption and higher functionality can be expected. When the plurality of sensors are different types of sensors, it is necessary to install a control device corresponding to a voltage or current, which is capable of corresponding to the respective sensors. In this case, a transformer, an analog-to-digital converter (ADC), and the like are necessary for an interface of the control device, and energy is consumed by energy conversion. The AI edge sensor module similarly consumes energy, but signals output from the AI edge sensor module to a central control unit have been recognized and identified in a certain manner by the AI edge sensor module, and only necessary information can be sent. With these functions, it is possible to reduce communication between the AI Edge sensor module and the central control device, thereby reducing energy consumption of the entire system.

A program for realizing a function of each unit (for example, the control unit 15) according to the embodiments described above may be recorded on a computer-readable recording medium (storage medium), and the program recorded on this recording medium may be loaded into and executed by a computer system so that a process is performed. Here, the "computer system" may include an operating system (OS) or hardware such as a peripheral device. Further, the "computer-readable recording medium" refers to a flexible disk, a magneto-optical disc, a writable non-volatile memory such as a read only memory (ROM) or a flash memory, a portable medium such as a digital versatile disc (DVD), or a storage device such as a hard disk built into the computer system. Further, the recording medium may be, for example, a recording medium on which data is temporarily recorded.

Further, the "computer-readable recording medium" may also include a recording medium that holds a program for a certain period of time, such as a volatile memory (for example, a dynamic random access memory (RAM)) inside a computer system including a server or a client when the program is transmitted over a network such as the Internet or a communication line such as a telephone line.

Further, the program may be transmitted from a computer system in which the program is stored in a storage device or the like to other computer systems via a transfer medium or by transfer waves in the transfer medium. Here, the "transfer medium" for transferring the program refers to a medium having a function of transferring information, such as a network (communication network) such as the Internet or a communication line such as a telephone line.

Further, the program may be a program for realizing some of the above-described functions. Further, the program may be a program capable of realizing the above-described functions in combination with a program previously stored in the computer system, that is, a so-called differential file (differential program).

The embodiments of the present invention have been described in detail above with reference to the drawings, but a specific configuration is not limited to the embodiments, and design changes and the like without departing from the gist of the present invention are included.

With the sum-of-products operator, the sum-of-products operation method, the logical operation device, and the neuromorphic device of the present invention, it is possible to easily realize a sum-of-products operation in which weights having a positive value and weights having a negative value are mixed.

EXPLANATION OF REFERENCES

1, 201, 401 Sum-of-products operator
11 Input unit
12 Array unit
13, 221 Conversion unit
14, 222 Output unit
15 Control unit
31-1 to 31-N Input register
32-1 to 32-N input signal generation circuit
33, 42-1 to 42-M, 411 signal line
41-11 to 41-NM Variable resistive element
61-1 to 61-M detection circuit
111 adder circuit 112 adjustment circuit
113 digital-to-analog converter
131-1 to 131-M, 281-1 to 281-M differential circuit
151-1 to 151-M, 311-1 311-M Output terminal
261-1 to 261-M Analog-to-digital converter
1011-1 to 1011-N Input signal
2011, 2021, 2031 Table
3011-3014, 3111-3114 Pulse frequency modulation signal

What is claimed is:

1. A sum-of-products operator comprising:
a first circuit configured to generate a plurality of signals, each of which corresponds to each of a plurality of data;
a second circuit including a first operation circuit configured to multiply each of the signals generated by the first circuit by a weight using a plurality of variable resistive elements having variable resistance values, and to calculate a sum of a plurality of results of multiplications;
a third circuit configured to calculate a first result that is a summation of values corresponding to the data, calculate a second result that is an adjustment of the summation of values, and output a value based on the second result; and
a fourth circuit including a differential circuit configured to output a difference between a calculated result in the first operation circuit of the second circuit and the value based on the second result from the third circuit.

2. The sum-of-products operator according to claim 1, wherein a result to be calculated in the first operation circuit of the second circuit and the first and second results to be calculated in the third circuit are analog signals, and
the differential circuit of the fourth circuit is an analog circuit.

3. The sum-of-products operator according to claim 1, wherein a result to be calculated in the first operation circuit of the second circuit and the first and second results to be calculated in the third circuit are digital data, and
the differential circuit of the fourth circuit is a digital circuit.

4. The sum-of-products operator according to claim 1, wherein a common variation range of conductance is set in the variable resistive elements,
the first operation circuit of the second circuit has capacitance for acquiring the sum of results of multiplication, and
the second result to be calculated in the third circuit is a result of multiplying (the result of summing the values corresponding to the data), (a central value of the common variation range of the conductance of the variable resistive elements), and {1/(the capacitance)} together.

5. The sum-of-products operator according to claim 1, wherein a common variation range of conductance in the variable resistive elements is set,
the first operation circuit of the second circuit has capacitance for acquiring the sum of results of multiplication, and
the second result to be calculated in the third circuit corresponds to a sum of: a result of multiplying a product of (the result of summing the values corresponding to the data), (a central value of the common variation range of the conductance of the variable resistive elements), and {1/(the capacitance)} by a first coefficient; and a second coefficient together.

6. The sum-of-products operator according to claim 1, wherein generation of the signals corresponding to the data in the first circuit is performed by the first circuit generating pulse width modulation signals, each of which corresponds to each of the data.

7. The sum-of-products operator according to claim 1, wherein generation of the signals corresponding to the data in the first circuit is performed by the first circuit generating amplitude width modulation signals, each of which corresponds to the data.

8. The sum-of-products operator according to claim 1, wherein generation of the signals corresponding to the data in the first circuit is performed by the first circuit generating pulse frequency modulation signals, each of which corresponds to the data.

9. The sum-of-products operator according to claim 1, wherein the second circuit has a plurality of the first operation circuits, and
the fourth circuit includes a differential circuit for each of the first operation circuits.

10. The sum-of-products operator according to claim 1, wherein the data are input to the third circuit in a time series order, and
the third circuit is configured to sum values corresponding to the data in the time series order.

11. The sum-of-products operator according to claim 1, wherein the variable resistive elements are magnetoresistive effect elements that exhibit a magnetoresistive effect.

12. A logical operation device comprising the sum-of-products operator according to claim 1, wherein the logical operation device executes a logic operation.

13. A neuromorphic device comprising the sum-of-products operator according to claim 1,
wherein one of the variable resistive elements of the sum-of-products operator is a neuromorphic element.

14. A sum-of-products operation method being performed in a sum-of-products operator including a first circuit, a second circuit, a third circuit, and a fourth circuit, the second circuit including a first operation circuit, and the fourth circuit including a differential circuit, the sum-of-products operation method comprising the steps of:
generating, by the first circuit, signals, each of which corresponds to each of a plurality of data;
multiplying, by the first operation circuit of the second circuit, each of the signals generated by the first circuit by a weight using a plurality of variable resistive elements having variable resistance values and calculating a sum of a plurality of results of multiplications;
calculating, by the third circuit, a first result that is a summation of values corresponding to the data, calculating a second result that is an adjustment of the summation of values, and outputting a value based on the second result; and
outputting, by the differential circuit of the fourth circuit, a difference between a calculated result in the first operation circuit of the second circuit and the value based on the second result from the third circuit.

* * * * *